United States Patent
Ladislaus et al.

(10) Patent No.: US 11,104,579 B2
(45) Date of Patent: Aug. 31, 2021

(54) PROCESS FOR PREPARING GRAPHENE

(71) Applicant: Kainos Innovation Limited, Chester (GB)

(72) Inventors: Paul Ladislaus, Sedgefield (GB); Andrew James Goodwin, Morpeth (GB); Richard John Price, Chester (GB)

(73) Assignee: Kainos Innovation Limited, Chester (GB)

(*) Notice: Subject to any disclaimer, the term of this patent is extended or adjusted under 35 U.S.C. 154(b) by 0 days.

(21) Appl. No.: 16/966,336

(22) PCT Filed: Jan. 31, 2019

(86) PCT No.: PCT/GB2019/050276
§ 371 (c)(1),
(2) Date: Jul. 30, 2020

(87) PCT Pub. No.: WO2019/150124
PCT Pub. Date: Aug. 8, 2019

(65) Prior Publication Data
US 2020/0369526 A1    Nov. 26, 2020

(30) Foreign Application Priority Data

Jan. 31, 2018  (GB) ...................... 1801590
Oct. 4, 2018   (GB) ...................... 1816214

(51) Int. Cl.
| C01B 32/194 | (2017.01) |
| C01B 32/205 | (2017.01) |
| C01B 32/184 | (2017.01) |

(52) U.S. Cl.
CPC .......... *C01B 32/205* (2017.08); *C01B 32/184* (2017.08); *C01B 32/194* (2017.08); *C01B 2204/04* (2013.01); *C01B 2204/32* (2013.01)

(58) Field of Classification Search
CPC ..... C01B 32/19; C01B 32/194; C01B 32/184; C01B 2204/26; C01B 2204/24;
(Continued)

(56) References Cited

U.S. PATENT DOCUMENTS

2013/0040124 A1   2/2013  Koo
2014/0335010 A1  11/2014  Sorensen
(Continued)

FOREIGN PATENT DOCUMENTS

CN   105523543   4/2016
EP     3037384   6/2016
(Continued)

OTHER PUBLICATIONS

Xu, Jiasheng, et al. "Liquid-phase exfoliation of graphene in organic solvents with addition of naphthalene." Journal of colloid and interface science 418 (2014): 37-42.*
(Continued)

*Primary Examiner* — Richard M Rump
(74) *Attorney, Agent, or Firm* — Fitch, Even, Tabin & Flannery LLP

(57) ABSTRACT

A process for preparing a product comprising one or more graphene layers, the process comprising: producing hydrodynamic cavitation in a liquid medium comprising a diaromatic component to synthesise the one or more graphene layers from the diaromatic component.

18 Claims, 17 Drawing Sheets

(58) Field of Classification Search
CPC ............ C01B 2204/22; C01B 2204/04; C01B 2204/02; C01P 2006/22; C01P 2004/51; C01P 2004/04; C01P 2002/85; C01P 2002/84; C01P 2002/82
See application file for complete search history.

(56) References Cited

U.S. PATENT DOCUMENTS

| | | |
|---|---|---|
| 2015/0225244 A1 | 8/2015 | Hintermann |
| 2015/0239741 A1 | 8/2015 | Burton |
| 2016/0019995 A1 | 1/2016 | Zhamu |
| 2017/0050855 A1* | 2/2017 | Shankman ............ C10M 177/00 |
| 2019/0161352 A1 | 5/2019 | Price |

FOREIGN PATENT DOCUMENTS

| | | |
|---|---|---|
| EP | 3056468 | 8/2016 |
| GB | 2543486 | 4/2017 |
| GB | 2544797 | 5/2017 |
| KR | 101465205 | 11/2014 |
| WO | 2011136478 | 11/2011 |
| WO | 2015120485 | 8/2015 |
| WO | 2015193268 | 12/2015 |
| WO | 2017089818 | 6/2017 |
| WO | 2017089825 | 6/2017 |
| WO | 2018020247 | 2/2018 |

OTHER PUBLICATIONS

Bianco, Alberto, et al., "All in the Graphene Family—A Recommended Nomenclature For Two-Dimensional Carbon Materials." Carbon, vol. 65, 2013, pp. 1-6.
British Application No. 1801590.9, Search Report, dated Jul. 16, 2018, 4 pages.
British Application No. 1816214.9, Combined Search and Examination Report, dated Feb. 28, 2019, 7 pages.
Cataldo, Franco. "Ultrasound-Induced Cracking and Pyrolysis of Some Aromatic and Naphthenic Hydrocarbons", Ultrasonics Sonochemistry, vol. 7, No. 1, Jan. 1, 2000, pp. 35-43.
Currell, Douglas L., et al., "On the Ultrasonic Cleavage of Some Aromatic and Heterocyclic Rings." Journal of American Chemical Society, vol. 80, Jan. 5, 1958, pp. 205-208.
Didenko, Yuri T., et al., "Temperature of Multibubble Sonoluminescence in Water." Journal of American Chemical Society, 1999, vol. 103, p. 10783-10788.
Dortmund Data Bank, DDBST GmbH (Oldenburg), Saturated Vapor Pressure, Calculation by Antoine Equation, website <http://ddbonline.ddbst.com/AntoineCalculation/AntoineCalculationCGI.exe>, believed to be publicly available at least as of Jul. 27, 2016, 1 page.
Dreyer, Daniel R., et al., "The Chemistry of Graphene Oxide." Chemical Society Reviews, 2010, vol. 39, pp. 228-240.
Feicht, Patrick, et al., "Facile and Scalable One-Step Production of Organically Modified Graphene Oxide By A Two-Phase Extraction." Carbon, vol. 80, 2014, pp. 229-234.
Flint, Edward B., et al., "The Temperature of Cavitation." Science, New Series, vol. 253, Issue 5026, Sep. 20, 1991, pp. 1397-1399.
Handbook of Fluid Dynamics and Fluid Machinery: Fundamentals of Fluid Dynamics, vol. I. Edited by Joseph A. Schetz and Allen E. Fuhs, John Wiley & Sons, Inc., 1996, pp. 161-162.
Hansen, Charles M., "Hansen Solubility Parameters: A User's Handbook." Second Edition, CRC Press, 2007, 526 pages.
He, Peng, et al., "Processable Aqueous Dispersions of Graphene Stabilized by Graphene Quantum Dots." Chemistry of Materials, Dec. 3, 2014, pp. 1-30.
Hernandez, Yenny, et al.,"High-Yield Production of Graphene by Liquid-Phase Exfoliation of Graphite." Nature Nanotechnology, vol. 3, Sep. 2008, pp. 563-568.
Hernandez, Yenny, et al., "Measurement of Multicomponent Solubility Parameters For Graphene Facilitates Solvent Discovery." Langmuir, vol. 26, No. 5, Nov. 2, 2009, pp. 3208-3213.

Herron, Christopher R., et al., "Simple and Scalable Route for the 'bottom-up' Synthesis of Few-Layer Graphene Platelets and Thin Films." Journal of Materials Chemistry, vol. 21, 2011, pp. 3378-3383.
International Patent Application No. PCT/GB2019/050276, International Search Report, dated May 6, 2019, 6 pages.
International Patent Application No. PCT/GB2019/050276, Written Opinion of the International Searching Authority, dated May 6, 2019, 11 pages.
Jang, Jinhee, et al., "Dispersibility of Reduced Alkylamine-Functionalized Graphene Oxides in Organic Solvents." Journal of Colloid and Interface Science, vol. 424, 2014, pp. 62-66.
Johnson, David W, et al., "A Manufacturing Perspective on Graphene Dispersions." Current Opinion in Colloid & Interface Science, vol. 20, 2015, pp. 367-382.
Kamo, Hiroaki, et al., "Formation of Poly-Peri-Naphthalene Thin Film By Chemical Vapor Depostion." Synthetic Metals, vol. 68, 1994, pp. 61-63.
Katoh, R., et al., "Sonochemical Production of a Carbon Nanotube." Ultrasonics Sonochemistry, vol. 6, 1999, pp. 185-187.
Katoh, Ryuzi, et al., "Possible New Route for the Production of C60 by Ultrasound." Ultrasonics: Sonochemistry, Butterworth-Heinemann, GB, vol. 5, No. 1, Mar. 1, 1998, pp. 37-38.
Katoh, Ryuzi, et al., "Sonochemical Polymerization of Benzene Derivatives: the Site of the Reaction." Ultrasonics Sonochemistry, vol. 5, 1998, pp. 69-72.
Kauppila, Jussi. "Graphene From Graphite by Chemical and Physical Techniques." Ph. D. thesis, University of Turku, 2014, 64 pages.
Kim, Sung, et al., "Size-dependence of Raman Scattering From Graphene Quantum Dots: Interplay Between Shape and Thickness." Applied Physics Letters, vol. 102, 2013, p. 053108-1-3.
Konios, Dimitrios, et al., "Dispersion Behaviour of Graphene Oxide and Reduced Graphene Oxide." Journal of Colloid and Interface Science, vol. 430, 2014, pp. 108-112.
Krishnamoorthy, Karthikeyan, et al., "The Chemical and Structural Analysis of Graphene Oxide with Different Degrees of Oxidation." Carbon, vol. 53, 2013, pp. 38-49.
Kuila, Tapas, et al., "Chemical Functionalization of Graphene and Its Applications." Progress in Materials Science, vol. 57, 2012, pp. 1061-1105.
Lockett, R.D., et al., "An Experimental Investigation Into the Effect of Hydrodynamic Cavitation on Diesel." International Journal of Engine Research, 2013, vol. 14, No. 6, pp. 606-621, 49 pages.
Lockett, Russel, et al., "An Optical Characterization of the Effect of High-Pressure Hydrodynamic Cavitation on Diesel." SAE Technical Papers Series, vol. 1, Apr. 5, 2016, 8 pages.
Lotya, Mustafa, et al., "High-Concentration, Surfactant-Stabilized Gaphene Dispersions." ACS Nano, vol. 4, No. 6, 2010, pp. 3155-3162.
Ma, Fengyun, et al., "Effect of Cavitation Treatment on the Chemical Composition of Coal Tar." Solid Fuel Chemistry, vol. 45, No. 5, Oct. 14, 2011, pp. 353-358.
Mason, Timothy J., et al., "Applied Sonochemistry: The Uses of Power Ultrasound in Chemisty and Processing." Weinham: Wiley-VCH, 2002, 311 pages.
McNamara III, William B., et al., "Sonoluminescence Temperatures During Multi-Bubble Cavitation." Nature, vol. 401, Oct. 21, 1999, pp. 772-775.
Misik, Vladimir, et al., "EPR Study of Free Radicals Induced By Ultrasound in Organic Liquids II*. Probing the Temperatures of Cavitation Regions." Ultrasonics Sonochemistry, vol. 3, 1996, pp. 25-37.
Misik, Vladimir, et al., "Free Radical Formation by Ultrasound in Organic Liquids: A Spin Trapping and EPR Study." Journal of Physical Chemistry, 1994, vol. 98, No. 6, pp. 1634-1640.
Murakami, M. "Morphology and Polymerization Mechanism of One-Dimensional Graphite Polymer, Poly-Peri-Naphthalene." Synthetic Metals, vol. 18, 1987, pp. 531-536.
Neppiras, E.A., "Acoustic Cavitation." Review Section of Physics Letters, vol. 61, No. 3, 1980, pp. 159-251.
NIST Chemistry WebBook, NIST Standard Reference Database No. 69, 2018, <https://webbook.nist.gov/chemistry/>, 4 pages.

(56) References Cited

OTHER PUBLICATIONS

Noltingk, B.E., et al., "Cavitation Produced by Ultrasonics." Proceedings of the Physical Society. Section B, vol. 63, 1950, pp. 674-685.

Paton, Keith R., et al., "Scalable Production of Large Quantities of Defect-Free Few-Layer Graphine by Shear Exfoliation in Liquids." Nature Materials, vol. 13, Jun. 2014, pp. 624-630.

Price, Gareth J., et al., "The Effect of High-Intensity Ultrasound on Diesel Fuels." 1995, vol. 2, No. 2, pp. S67-S70.

Price, Gareth J., et al., "Use of High-Intensity Ultrasound as a Potential Test Method for Diesel Fuel Stability." Fuel, 1995, vol. 74, No. 9, pp. 1394-1397.

Price, R.J., et al., Understanding the Impact of Cavitation On Hydrocarbons in the Middle Distillate Range. Fuel, IPC Science and Technology Press, Guildford, GB, vol. 156, Apr. 22, 2015, pp. 30-39.

Riesz, P., et al., "Free Radical Generation by Ultrasound in Aqueous and Nonaqueous Solutions." Environmental Health Perspectives, vol. 64, 1985, pp. 233-252.

Sobon, Grzegorz, et al., "Graphene Oxide vs. Reduced Graphene Oxide as Saturable Absorbers for Er-doped Passively Mode-Locked Fiber Laser." Optics Express, vol. 20, No. 17, Aug. 13, 2012, pp. 19464-19473.

Suslick, Kenneth S., et al., "Alkane Sonochemistry." Journal of Physical Chemistry, vol. 87, 1983, pp. 2299-2301.

Suslick, Kenneth S., et al., "Inside a Collapsing Bubble: Sonoluminescence and the Conditions During Cavitation." Annual Review of Physical Chemistry, vol. 59, 2008, pp. 659-683.

Suslick, Kenneth S., et al., "The Sonochemical Hot Spot." Journal of American Chemical Society, 1986, vol. 108, pp. 5641-5642.

Treier, Matthias, et al., "Surface-Assisted Cyclodehydrogenation Provides A Synthetic Route Towards Easily Processable and Chemically Tailored Nanographenes." Nature Chemistry, vol. 3, Jan. 2011, pp. 61-67.

Vencel, T., et al., "Oxygen Exclusion from the Organic Solvents Using Ultrasound and Comparison with Other Common Techniques Used in Photochemical Experiments." Chemical Papers, vol. 59, No. 4, 2005, pp. 271-274.

Xu, Hangxun, et al., "Sonochemical Synthesis of Nanomaterials." Chemical Society Review, 2013, vol. 42, pp. 2555-2567.

Yang, T., et al., "Synthesis and Characterization of Alkylamine-Functionalized Graphene for Polyolefin-Based Nanocomposites." Applied Surface Science, vol. 305, 2014, pp. 725-731.

Yi, Min, et al., "Achieving Concentrated Graphene Dispersions in Water/Acetone Mixtures by the Strategy of Tailoring Hansen Solubility Parameters." Journal of Physics D: Applied Physics, vol. 46, 2013, 9 pages.

Yu-Fang, Ye, et al., "Increase of Acenaphthene Content in Creosote Oil by Hydrodynamic Cavitation." Chemical Engineering and Processing, vol. 104, Mar. 3, 2016, pp. 66-74.

Zechmeister, L., et al., "On the Cleavage of Benzene, Thiophene and Furan Rings by Means of Ultrasonic Waves." Journal of American Chemical Society, vol. 77, May 20, 1955, pp. 2853-2855.

Zechmeister, L., et al., "On the Ultrasonic Cleavage of the Pyridine Ring." Journal of American Chemical Society, vol. 78, May 20, 1956, pp. 2149-2150.

Cravotto, Giancarlo, et al. "Sonication-Assisted Fabrication and Post-Synthetic Modifications of Graphene-Like Materials." Chemistry: A European Journal, vol. 16, 2010, pp. 5246-5259.

Riesz, Peter, et al., "Free Radical Formation Induced By Ultrasound and Its Biological Implications." Free Radical Biology & Medicine, 1992, vol. 13, pp. 247-270.

Zhang, Lu, et al. "Rationally Designed Surfactants for Few-Layered Graphene Exfoliation: Ionic Groups Attached to Electron-Deficient π-Conjugated Unit Through Alkyl Spacers." ACS Nano, 2014, vol. 8, No. 7, pp. 6663-6670.

\* cited by examiner

PROCESS FOR PREPARING GRAPHENE

TECHNICAL FIELD

This invention relates to processes for preparing products comprising graphene layers. In particular, though not exclusively, the invention relates to processes for preparing graphene nanomaterials and substrate-bound graphene materials. Aspects of the invention also relate to products obtainable by the processes.

BACKGROUND

Graphene in its pristine form is a two-dimensional single layer of continuous hexagonally arranged carbon atoms. It has been shown to have a number of interesting physical properties; including large surface area, immense strength, and extremely high thermal and electrical conductivity. Sheets of the material are flexible, impermeable to gases and relatively transparent, leading to a broad range of potential applications including electronic devices, energy storage materials, polymer nanocomposites, conductive inks and sensors.

The biggest challenge to the successful future application of graphene in new devices is the availability of the material. To date, the main production focus has been on 'top-down' approaches, which involve breaking stacked layers of graphite apart to yield graphene sheets. Exfoliation of graphite was first reported by micromechanical cleavage and subsequently has been achieved electrochemically, by sonication and high shear. The breakdown of layers can also be aided by the conversion of graphite to graphite oxide or intercalated graphite as a first step in top-down synthesis. All such routes are dependent upon the availability of high quality graphite.

'Bottom-up' methods of synthesis from alternative sources of carbon (generally small molecules) that require high temperatures have also been investigated. Large area films of graphene can be grown on metals or silicon carbide substrates, although substrate removal can present difficulties. Graphene nanomaterials have been synthesised by Chemical Vapour Deposition (CVD) without the use of any substrates. Graphene is typically collected outside of the furnace and production can therefore take place as a continuous process. An example of this type of approach is graphene production by the microwave-enhanced CVD of ethanol at atmospheric pressure. The thermal decomposition of sodium ethoxide in ethanol to produce few-layer graphene via substrate free CVD has also been demonstrated.

Recently there has been growing interest in the fabrication of graphene in the form of narrow strips (Graphene Nano Ribbons, GNRs) and dots (Graphene Quantum Dots, GQDs). GQDs are sufficiently small (<30 nm) to produce quantum confinement and size dependent photoluminescence as a result of changing the zero band gap found in conventional forms of graphene. Carbon-based GQDs offer some advantages over quantum dots fabricated from inorganic semiconductor materials with respect to their toxicity and cost.

Again the synthesis of GQDs falls into two broad categories: top-down and bottom-up. Top-down approaches start with the conversion of graphite into sheets of graphite oxide. A cutting procedure (hydrothermal, solvothermal, electrochemical, nano lithography, microwave-assisted, nanotomy-assisted or ultrasonic) is then applied to convert these sheets into smaller GQDs.

Bottom-up approaches use the pyrolysis and polymerization of small organic molecules. For example hexa-peri-hexabenzocoronene has been pyrolysed, oxidized, functionalized and reduced to form disk-like GQDs that are 60 nm in diameter with a thickness of 2-3 nm. Other starting materials have also been employed, including citric acid, glutathione, L-glutamic acid and pyrene. The ruthenium catalysed cage opening of $C_{60}$ produces GQDs, the shape of which is tailored by controlling the annealing temperatures.

The list of potential applications for GQDs includes catalysis, bio-imaging (e.g. membrane markers), optoelectronics (LEDs), printing, photodetectors, quantum computing and energy conversion devices.

A need however remains for 'bottom-up' methods to enhance the availability of graphene nanomaterials and other materials comprising graphene layers. It is an object of the invention to address this problem and/or another problem associated with the prior art.

SUMMARY OF THE INVENTION

It has been found that hydrodynamic cavitation of a liquid medium comprising a diaromatic component synthesises graphene layers.

A first aspect of the invention provides a process for preparing a product comprising one or more graphene layers, the process comprising: producing hydrodynamic cavitation in a liquid medium comprising a diaromatic component to synthesise the one or more graphene layers from the diaromatic component.

The term "graphene layer" is used herein to refer to a single-atom-thick sheet of hexagonally arranged $sp^2$-bonded carbon atoms, either occurring within a multi-layer structure or by itself, optionally comprising impurities.

Cavitation is a process of vaporisation, bubble generation and bubble implosion which occurs in liquids as a result of a decrease and subsequent increase in local pressure. Cavitation thus occurs when a liquid is subjected to rapid changes of pressure. Hydrodynamic cavitation occurs in a liquid as a result of a decrease and subsequent increase in local pressure caused by flow of the liquid.

The process of bubble generation, and the subsequent growth and collapse of the cavitation bubbles, momentarily results in locally high energy densities, temperatures and pressures at the surface of the bubbles. Without wishing to be bound by theory, it is thought that this leads to the synthesis of graphene layers from diaromatic hydrocarbon component.

In the process according to the first aspect of the invention, hydrodynamic cavitation is generally produced by imparting a flow to the liquid medium to cause a pressure decline in part of the liquid medium to below the saturated vapour pressure of the diaromatic component and subsequently a pressure recovery to above said vapour pressure, thereby synthesising the graphene layers from the diaromatic component. The flow of the liquid medium may be relative to a stationary obstruction, such as a constriction, or a moving obstruction, such as a propeller.

Advantageously, the hydrodynamic cavitation may be produced by flowing a feed of the liquid medium through a constriction. A range of apparatus for flowing a feed of liquid medium through a constriction are also known in the art, including for example homogenisers and microfluidisers.

The constriction may, for example, have a maximum width of less than 1 mm; or less than 500 microns; or less than 400 microns; or less than 300 microns; or less than 200 microns; or less than 100 microns.

In some embodiments, the constriction is annular. Suitably, the constriction may be formed between an impact ring defining a central opening and an impact head positioned within the central opening.

Advantageously, the process may comprise flowing a feed of liquid medium into a conduit having a principal axis, wherein the conduit is arranged to direct the liquid medium against an impact head having a face perpendicular or predominantly perpendicular to said principal axis; the impact head and the conduit being arranged so that an annular constriction results between an end of the conduit proximate to the impact head and the impact head. The constriction may form a continuous region surrounding the end of the conduit and may be substantially coplanar with the impact head. An impact head surround may extend the region in which the fluid is constrained before exiting the core components. Optionally, the temperature of the feed may be controlled by passing it through a chiller prior to entering the conduit.

The process may comprise flowing a feed of the liquid medium through an apparatus as claimed or described in GB2543486A, which is incorporated herein by reference. The apparatus in GB2543486A is described for use in delaminating graphene from graphite. However, such an apparatus has been found to cause hydrodynamic cavitation when liquid medium is forced through the gap or constriction thereof. As such, graphene layers can be synthesised by passing the liquid medium through such an apparatus.

Advantageously, the feed of liquid medium may be pressurised to a pressure of at least 200 bar; or at least 300 bar; or at least 400 bar; or at least 600 bar; or at least 800 bar; or at least 1000 bar; or at least 1200 bar; or at least 1400 bar; or at least 1600 bar; or at least 2000 bar; or at least 2400 bar; or at least 3000 bar.

Suitably, the pressure drop from the feed to the end of the constriction may be at least 200 bar; or at least 300 bar; or at least 400 bar; or at least 600 bar; or at least 800 bar; or at least 1000 bar; or at least 1200 bar; or at least 1400 bar; or at least 1600 bar; or at least 2000 bar; or at least 2400 bar; or at least 3000 bar.

Cavitation in a given system may be predicted using a cavitation number (CN), a dimensionless number used for cavitating flows in nozzles. This may be determined as follows, for a flow of a fluid through a constriction:

$$CN^{-1} = \frac{p_d - p_v}{p_u - p_d}$$

where $p_d$ is the pressure downstream of the constriction $p_v$ is the vapor pressure of the fluid $p_u$ is the pressure of the fluid upstream of the constriction Advantageously, the liquid medium may be subjected to a flow with a cavitation number (CN) of more than 1; or more than 2; or more than 10; or more than 20.

The liquid medium may suitably be kept at a low temperature. This can help to reduce generation of fumes from the diaromatic component. Advantageously, a low temperature may also enhance the synthesis of the product by cavitation. In particular, a low temperature reduces vapour pressure in cavitation bubbles, leading to higher temperatures on collapse of the bubbles.

Optionally, the liquid medium may be kept at a temperature of less than 70° C.; or less than 60° C.; or less than 50° C.; or less than 40° C.; or less than 30° C.; or less than 20° C.; or less than 15° C.; or less than 10° C.

Preferably, for consistency, the temperature of the liquid medium be kept substantially constant, e.g. within a range of plus/minus 5° C.; or a range of plus/minus 2° C.

Conveniently, the process may comprise recycling the liquid medium and repeatedly producing cavitation therein. Suitably, the liquid medium may be cycled through a cavitating flow loop. The process may comprise separating the product from an amount of liquid medium to be recycled and subsequently recycling said amount of liquid medium to the start of the process.

The process presents a bottom-up synthesis of products comprising one or more graphene layers by the cavitation of diaromatics. The one or more graphene layers may be functionalised, as will be discussed below. Advantageously, the process may be run continuously, making it suitable for industrial volumes. Hydrodynamic reactors also offer increased cavitational yields compared to other reactors, e.g. ultrasound reactors. The flow of liquid allows greater power to be applied without the number density of bubbles becoming an issue as in ultrasound. Additionally, the physical scaling of the reactor is straightforward and well-known in the industry, allowing power input and production rates to be readily increased. The process is therefore advantageously suited to scale up.

Multi-layer graphene products, i.e. those comprising a plurality of graphene layers, may display a crystalline order or may be turbostratic, i.e. lacking any observable registry of the graphene layers.

The synthesis offers potential for the fabrication of advantageous graphene nanomaterials all the way down to the dimensions of graphene quantum dots. It also allows formation of one or more graphene layers on substrate particles to provide substrate-borne graphene materials.

The graphene layers, one or more graphene nanomaterial particles, or indeed a graphene nanomaterial as a whole, may be pristine. The term "pristine" is used herein to describe graphene layers, nanomaterial particles or nanomaterials substantially free from impurities. Such materials may be achievable by substantially eliminating impurity sources from the process.

Alternatively, the graphene layers, one or more graphene nanomaterial particles, or indeed a graphene nanomaterial as a whole, may comprise one or more impurities. For example, the layers, particles or material as a whole may be oxidised.

Typical impurities are heteroatoms e.g. defined as O, S, N, and P. Sources for such impurities include air and the components of the liquid medium. The extent of the impurities may be defined by a C/heteroatom atomic ratio. Suitably, a graphene layer, graphene nanomaterial particle, or indeed the graphene nanomaterial as a whole, may have a C/heteroatom ratio of at least 2, in particular of at least 3, or even of at least 5 or 10. In some embodiments of the invention, the C/heteroatom atomic ratio is in the range of from 2 to 10. Pristine graphene layers or nanomaterial may, for example, have a C/heteroatom atomic ratio of at least 20, or even of at least 50 or of at least 100.

Partially oxidised graphene layers are particularly common and may lead to desirable properties in the graphene nanomaterial. Suitably, a graphene layer, graphene nanomaterial particle, or indeed the graphene nanomaterial as a whole, may have a C/O atomic ratio of at least 2, in particular of at least 3, or even of at least 5 or 10. In some embodiments of the invention, the C/O atomic ratio is in the range of from 2 to 10. Pristine graphene layers or nanomaterial may, for example, have a C/O atomic ratio of at least 20.

Since, for some applications, impurities are desirable, the graphene layer, graphene nanomaterial particle, or indeed the graphene nanomaterial as a whole, may have a C/heteroatom ratio (and/or a C/O atomic ratio) of at most 20, in particular of at most 10, or even of at most 5.

The one or more graphene layers may be functionalised or unfunctionalised. A functionalised graphene layer comprises a functional group covalently bonded to the graphene layer. Functional groups may conveniently bond with one or more heteroatom impurities of a graphene layer and may optionally be incorporated as part of the cavitation process.

In some embodiments, the product comprises or consists of a graphene nanomaterial.

The term "graphene nanomaterial" is used herein to refer to a plurality of particles each comprising or consisting of one or more graphene layers and sized, in at least one dimension, in the range of from the thickness of a single graphene layer to about 100 nm. Such particles are referred to herein as "graphene nanomaterial particles". Graphene nanomaterial particles as defined herein comprise at least 30 carbon atoms, suitably at least 100 carbon atoms.

The graphene nanomaterial may comprise or consist of graphene nanomaterial particles each independently comprising or consisting of in the range of from 1 to 200 graphene layers, in particular 1 to 100 graphene layers, such as in the range of from 1 to 30 graphene layers, or even in the range of from 1 to 20 or in the range of from 1 to 10 graphene layers.

Suitably, the graphene nanomaterial may comprise or consist of graphene, bilayer graphene, few-layer graphene, multi-layer graphene, or combinations thereof.

The term "graphene" is used herein to refer to a graphene layer occurring by itself as a graphene nanomaterial particle, i.e. not forming an integral part of a multi-layer structure.

The term "bilayer graphene" is used herein to refer to a graphene nanomaterial particle consisting of two stacked graphene layers.

The term "trilayer graphene" is used herein to refer to a graphene nanomaterial particle consisting of three stacked graphene layers.

The term "few-layer graphene" is used herein to refer to a graphene nanomaterial particle consisting of 2 to 5 stacked graphene layers.

The term "multi-layer graphene" is used herein to refer to a graphene nanomaterial particle consisting of 2 to 10 stacked graphene layers.

The graphene nanomaterial particles may, for example, be a graphene quantum dots, graphene nanoflakes, graphene nanoribbons, graphene nanosheets, or combinations thereof.

The term "graphene quantum dots" is used herein to refer to graphene nanomaterial particles with a maximum dimension of less than 30 nm.

The term "graphene nanoflakes" is used herein to refer to graphene nanomaterial particles with a maximum dimension of less than 100 nm.

The term "graphene nanoribbons" is used herein to refer to ribbons of graphene or multi-layer graphene with a width of less than 50 nm and a length greater than the width.

The term "graphene nanosheet" is used herein to refer to graphene nanomaterial particles with a maximum dimension of less than 2000 nm, preferably less than 1000 nm.

In some embodiments, the product comprises a substrate-borne graphene material. Such a material may be formed by synthesising the one or more graphene layers on a substrate, e.g. silicon or carbon particles.

A substrate-borne graphene material may optionally be a nanomaterial, with a maximum thickness of 100 nm. However, a greater thickness may be expedient for such materials, depending for example on the desired substrate.

Suitably, a substrate-borne graphene material may comprise particles comprising from 1 to 200 graphene layers, in particular 1 to 100 graphene layers, such as in the range of from 1 to 30 graphene layers, or even in the range of from 1 to 20 or in the range of from 1 to 10 graphene layers.

The process comprises hydrodynamically cavitating a liquid medium comprising a diaromatic component consisting of one or more diaromatic hydrocarbons or diaromatic heterocycles.

Diaromatic hydrocarbons or heterocycles of use include fused diaromatic hydrocarbons or heterocycles, and linked (biphenyl-like) diaromatic hydrocarbons and heterocycles.

Advantageously, the diaromatic component may be a diaromatic hydrocarbon component consisting of one or more diaromatic hydrocarbons.

Suitable diaromatic hydrocarbons or heterocycles may optionally be substituted, for example with one or more alkyl, alkenyl or alkynyl substituents. Suitably, the one or more substituents may be $C_1$ to $C_5$ substituents, in particular methyl or ethyl. Substituents, for example a single methyl or ethyl substituent, may advantageously lead to a lower melting point, which facilitates incorporation of the diaromatic hydrocarbon or heterocycle into the liquid medium. However, as substituents can lower the rate of nanomaterial formation, a balance may advantageously be struck between the convenience of forming the liquid medium and reaction rates.

Suitable diaromatic hydrocarbons and heterocycles include compounds of Formula A or Formula B, or heterocyclic variants thereof, optionally substituted with one or more moieties at one or more of the numbered positions:

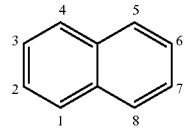

Formula A

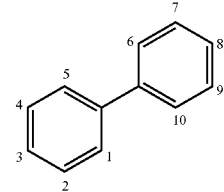

Formula B

Suitable moieties include those that may be fractured or detached from their numbered position by thermally driven fission, in particular under conditions of cavitation.

Examples of suitable moieties include alkyl, alkenyl or alkynyl substituents, and halides. Suitably, a moiety may be present at one, two, three or four, or more than four of the numbered positions.

Suitably, an alkyl, alkenyl or alkynyl moiety may comprise 1 to 5 carbon atoms. Particular examples of such moieties include methyl and ethyl.

Suitably, a halide moiety may be selected from Cl, Br or F.

In various embodiments, the diaromatic component comprises or consists of one or more substituted or unsubstituted heterocyclic variants of Formula A or Formula B. In such heterocyclic variants N may replace C in the rings at one or more of the numbered positions. Optionally, the heterocyclic variant may comprise one or two replacements of C with N. One example of such a heterocyclic variant is quinoline.

In various embodiments, the diaromatic component comprises or consists of one or more substituted or unsubstituted compounds of Formula A.

In various embodiments, the diaromatic component comprises or consists of substituted or unsubstituted compounds of Formula B.

Examples of useful diaromatic hydrocarbons include naphthalene and alkyl substituted naphthalene, in particular methylnaphthalene, e.g. 1-methylnaphthalene, or mixtures thereof.

In some embodiments, the diaromatic component comprises in the range of from 1 to 40% v/v, in particular in the range of from 1 to 30% v/v based on the total volume of the component, of naphthalene, with the remainder of the component being made up by a substituted naphthalene having a lower melting point than naphthalene, e.g. methylnaphthalene, in particular 1-methylnaphthalene.

Suitably, the liquid medium may comprise a diaromatic component consisting of methylnaphthalene, such as 1-methylnaphthalene, and optionally naphthalene. In some embodiments, the diaromatic component consists (substantially) of methylnaphthalene, e.g. 1-methylnaphthalene.

Advantageously, the liquid medium may comprise at least 10% v/v, or at least 25% v/v of the diaromatic component, based on the total volume of the liquid medium before cavitation. In some embodiments, the liquid medium comprises at least 50% v/v of the diaromatic component, at least 75% v/v of the diaromatic component, or even at least 95% v/v of the diaromatic component. In various embodiments, the liquid medium consists (substantially) of the diaromatic component.

Optionally, the liquid medium may comprise one or more other components making up a balance of the liquid medium before cavitation.

The inclusion of a stabilising component may be useful for stabilising the dispersion of graphene nanomaterial to be formed.

A suitable stabilising component may be chosen, for example, with reference to Hansen Solubility Parameters. For example, the stabilising component may comprise or consist of a solvent which, on addition to the liquid medium, is capable of reducing the distance in Hansen space between the predicted Hansen Solubility Parameters of the liquid medium (HSPs: $\delta_{Ds}$, $\delta_{Ps}$ and $\delta_{Hs}$) and of graphene, graphene oxide or reduced graphene oxide (HSPs: $\delta_{Dg}$, $\delta_{Pg}$ and $\delta_{Hg}$). In particular, the solvent may reduce R, where $R^2=4(\delta_{Dg}-\delta_{Ds})^2+(\delta_{Pg}-\delta_{Ps})^2+(\delta_{Hg}-\delta_{Hs})^2$.

Where a stabilising component or other component is included in the liquid medium prior to cavitation, the nature and amount of the component must be consistent with permitting the formation of graphene nanomaterial by cavitation of the liquid medium.

One example of a suitable stabilising component is N-Methyl-2-pyrrolidone (NMP), which has been found to stabilise the dispersion of the graphene nanomaterial in the liquid medium. NMP has been found to permit formation of graphene nanomaterial by cavitation of the liquid medium, even when present at high concentrations.

Suitably, the liquid medium may comprise in the range of from 1 to 90% v/v stabilising component, in particular NMP, such as in the range of from 10 to 75% v/v stabilising component, or even in the range of from 20 to 50% v/v stabilising component.

Suitably, the liquid medium may consist of the diaromatic component and a balancing amount of stabilising component, in particular NMP, and optionally a functionalising component.

To provide functionalised graphene nanomaterial, the liquid medium may advantageously comprise a functionalising component so that cavitating the liquid medium synthesises, from the diaromatic hydrocarbon component and functionalising component, a functionalised graphene nanomaterial dispersed in the liquid medium. A functionalised graphene nanomaterial product is then obtained from the dispersion.

The functionalising component may comprise or consist of molecules able to form covalent bonds with graphene layers, in particular heteroatom impurities thereof (e.g. oxygen).

Advantageously, the functionalising component may functionalise the graphene nanomaterial so as to aid dispersion of the graphene nanomaterial in the liquid medium. In particular, the functionalising component may be selected to enhance dispersion stability of the graphene nanomaterial in the liquid medium, e.g. by making the graphene nanomaterial more polar or less polar.

Suitably, the functionalising component may comprise or consist of one or more compounds capable of taking part in a nucleophilic substitution, electrophilic substitution, condensation reaction or addition reaction. Such compounds may be chosen to increase or decrease the polarity of the graphene nanomaterial, for example to facilitate its dispersion.

In various embodiments, the functionalising component comprises or consists of molecules comprising an amine group, in particular a primary amine group. Suitably, the functionalising component may comprise or consist of an alkylamine, in particular a primary alkylamine. The alkyl amine may, for example, have in the range of from 5 to 20 carbon atoms, e.g. in the range of from 6 to 12 carbon atoms.

In various embodiments, the functionalising component comprises or consists of molecules comprising a hydroxyl or peroxide group. Such molecules may advantageously comprise a terminal hydroxyl group. Suitably, the functionalising component may comprise or consist of water, hydrogen peroxide, an alcohol (primary, secondary or tertiary), or a mixture thereof.

In various embodiments, the functionalising component comprises or consists of molecules comprising a carboxylic acid group. Suitably, the functionalising component may comprise or consist of an organic acid.

Advantageously, to aid solubility with the diaromatic component in the liquid medium, the functionalising component may comprise or consist of aromatic molecules. Advantageously, the polarity of such a functionalising component may be tailored by substituents. For example, the aromatic molecules may be substituted with one or more polar or non-polar groups, for example alkyl, hydroxyl, or carboxylic acid.

In various embodiments, the functionalising component comprises or consists of one or more of: octylamine, dodecylamine, $H_2O$, HOOH, acetic acid, tri(ethylene glycol) monoethyl ether, aniline, benzoic acid, phenol and formic acid.

Optionally, the functionalising component may be present in an amount in the range of from 0.01 to 10% v/v based on the total volume of the liquid medium. Suitably, the functionalising component may be present in an amount in the range of from 0.05 to 5% v/v, or in the range of from 0.1 to 1% v/v.

The functionalising component may also comprise or consist of materials that are not miscible or soluble in diaromatic hydrocarbons. In an embodiment, the liquid medium comprises an emulsion of the functionalising component in the diaromatic component. Suitably, the emulsion may be kinetically and/or thermodynamically stable.

Heteroatom content, in particular oxygen content in the nanomaterial facilitates functionalisation. Accordingly, the process may advantageously comprise cavitating the liquid medium comprising a functionalising component in the presence of oxygen or another heteroatom impurity as herein defined, e.g. in the presence of air.

Conveniently, the process may comprise cavitating the liquid medium with air dissolved therein. Suitably, the liquid medium may comprise at least 1 mg/L air, such as at least 10 mg/L air or even at least 100 mg/L air, or even at least 200 mg/L air.

Advantageously, the liquid medium may have an initial boiling point in the range of from 180 to 300° C., in particular in the range of from 200 to 260° C.

Conveniently, the liquid medium may be substantially free from graphite and/or other exfoliation precursors of graphene nanomaterial.

In an embodiment, the process comprises treating the liquid medium, prior to cavitation, to reduce air or oxygen dissolved therein. This has been shown to increase the purity of the graphene nanomaterial, i.e. to reduce impurities in the graphene nanomaterial as a whole. Suitably, the process may comprise sparging the liquid medium with an inert gas, for example nitrogen, to reduce air or oxygen dissolved in the liquid medium. Additionally or alternatively the liquid medium may be subjected to one or more freeze-thaw cycles.

If desired, the liquid medium may be degassed by cavitation, for example immediately before or during the synthesis of the product.

To enable formation of a substrate-borne graphene material, a dispersion of substrate particles may be added to the liquid medium.

In various embodiments the substrate particles may comprise silicon or carbon.

Suitably, the substrate particles may have a high surface area, for example at least 200 m$^2$/g; or at least 500 m$^2$/g; at least 1000 m$^2$/g; or at least 2000 m$^2$/g.

In some embodiments, the substrate-borne graphene material may comprise high surface area carbon particles bearing one or more graphene layers. Such particles may be of particular advantage, offering high surface areas and a conductive graphene surface.

In some embodiments, the substrate-borne graphene material may comprise silicon particles bearing one or more graphene layers.

Optionally, the liquid medium may bear up to about 100 g/l of substrate particles; or up to 50 g/l; or up to 20 g/l; or up to 10 g/l; or up to 5 g/l.

Particularly where substrate particles are included in the liquid medium, the process may advantageously comprise providing an in-line pump to ensure continuous and consistent flow of the liquid medium through a constriction.

Suitably, the substrate particles may have a mesh size of less than 700 microns; or less than 500 microns; or less than 400 microns; or less than 300 microns. Conveniently, substrate particles may, for example have a volume average particle size of less than 200 microns; or less than 100 microns; or less than 50 microns.

Smaller particles have the advantage of avoiding blockage of constrictions that might conveniently be employed to provide hydrodynamic cavitation in the liquid medium.

For some applications, it may be preferable to produce cavitation by alternative means such as ultrasound. Indeed, from a second aspect, the invention extends broadly to a process for preparing a product comprising substrate particles bearing one or more graphene layers, the process comprising: producing cavitation in a liquid medium comprising a diaromatic component and carrying a dispersion of the substrate particles to synthesise the one or more graphene layers from the diaromatic component on the substrate particles.

The cavitation may be hydrodynamic, e.g. as elsewhere described herein, or may be produced by other techniques known in the art, e.g. sonication.

Cavitation of the liquid medium (in accordance with the first or second aspect of the invention) may synthesise the product as a dispersion in the liquid medium.

The process may advantageously comprise stabilising the dispersion, e.g. to permit utilisation or transport of the product in the stabilised dispersion.

Stabilising the dispersion reduces the tendency of the product to agglomerate and/or settle. Advantageously, stabilising the dispersion may comprise forming a colloid of the dispersed product in the liquid medium, such that particles of the product do not settle.

Suitably, the dispersion may be stabilised by the inclusion of a stabilising component in the liquid medium prior to cavitation, e.g. as aforesaid. Additionally or alternatively, the dispersion may be stabilised by the addition of a stabilising component during and/or after cavitation of the liquid medium.

Thus the process may comprise adding a stabilising component to the liquid medium before, during or after cavitation. The stabilising component may suitably comprise or consist of a solvent which, on addition to the liquid medium, is capable of reducing the distance in Hansen space between the predicted Hansen Solubility Parameters of the liquid medium (HSPs: $\delta_{Ds}$, $\delta_{Ps}$ and $\delta_{Hs}$) and of graphene, graphene oxide or reduced graphene oxide (HSPs: $\delta_{Dg}$, $\delta_{Pg}$ and $\delta_{Hg}$). In particular, the solvent may reduce R, where $R^2 = 4\ (\delta_{Dg} - \delta_{Ds})^2 + (\delta_{Pg} - \delta_{Ps})^2 + (\delta_{Hg} - \delta_{Hs})^2$.

Advantageously, the stabilising component may comprise or consist of NMP. However, other stabilising components may also be readily used.

The amount of stabilising component included or added may vary depending on stabilisation requirements. Suitably, the dispersion may comprise in the range of from 1 to 90% v/v stabilising component, in particular NMP, such as in the range of from 10 to 75% v/v stabilising component, or even in the range of from 20 to 50% v/v stabilising component.

Additionally or alternatively, the process may comprise separating or purifying the product. In particular, the product may be synthesised as a dispersion in the liquid medium and subsequently separated from the liquid medium.

Optionally, the process may comprise centrifuging a dispersion of the product in the liquid medium to separate at least part of the product from the liquid medium. Suitably, the dispersion may be centrifuged at a speed of at least 500 rpm; or at least 1000 rpm; or at least 2000 rpm.

The process may advantageously comprise obtaining the product as a solid residue after liquid medium is removed e.g. by centrifuging or another separation technique. The removed liquid medium may be recycled to the start of the process.

Advantageously, the process may be run continuously. For example, a continuous feed of the liquid medium may be cycled through a constriction to produce the hydrodynamic cavitation.

Optionally, product may be continuously separated from the liquid medium. Suitably, a disk stack centrifuge may be employed for continuous separation. An example of a suitable centrifuge is described in WO2017089818A1, which is incorporated herein by reference.

A third aspect of the invention provides a product comprising one or more graphene layers obtainable by or obtained by a process according to the first aspect of the invention.

A fourth aspect of the invention provides a substrate-borne graphene material comprising substrate particles bearing one or more graphene layers. The particles and graphene layers may be as described herein in respect of other aspects or embodiments of the invention.

A fifth aspect of the invention provides the use of a product according to any aspect or embodiment of the invention in an electrode, for example a battery anode or a capacitor electrode.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

Where upper and lower limits are quoted for a property, then a range of values defined by a combination of any of the upper limits with any of the lower limits may also be implied.

In this specification, references to compound properties are—unless stated otherwise—to properties measured under ambient conditions, i.e. at atmospheric pressure and at a temperature of from 16 to 22 or 25° C., or from 18 to 22 or 25° C., for example about 20° C. or about 25° C.

BRIEF DESCRIPTION OF THE DRAWINGS

One or more non-limiting examples of the invention will now be described with reference to the accompanying drawings, in which:

FIG. 12a: sample L7716; FIG. 12b: sample L7826; FIG. 12c: sample L7831; FIG. 12d: sample L7829; FIG. 12e: sample L7832;

FIG. 13a: sample L7716; FIG. 13b: sample L7826; FIG. 13c: sample L7831; FIG. 13d: sample L7829; FIG. 13e: sample L7832;

FIG. 15a: sample L7716; FIG. 15b: sample L7826; FIG. 15c: sample L7831; FIG. 15d: sample L7829; FIG. 15e: sample L7832.

DETAILED DESCRIPTION

The following non-limiting examples illustrate embodiments of the invention and its working.

Example 1 (Preliminary Study)

A mixture of 1-methyl naphthalene (1-MN) and naphthalene (NAP) was cavitated using ultrasound. Specifically, samples were prepared from the cavitation of 1-MN/NAP ($\phi_{1-MN}=0.8$, $\phi_{NAP}=0.2$) using ultrasound produced by a VCX 750 (750 W) ultra-sonic processor (ex Sonics Materials Inc.) and a 13 mm extender horn that delivered 20 kHz ultrasound to 50 mL of sample contained within a jacketed glass beaker. Cold water (10° C.) was passed through the jacket to keep the liquid hydrocarbon below its flash point.

A dispersion was produced under air. This was not stable and after standing for seven days was centrifuged at 3500 r min$^{-1}$ for 20 minutes. The brown supernatant was removed by pipette ($A_{1-MN}$) and the remaining black sediment added to N-Methyl-2-pyrrolidone (NMP) (50 mL) followed by a short period (10 kJ) of sonication to produce a black dispersion ($B_{NMP}$).

Figure 1:
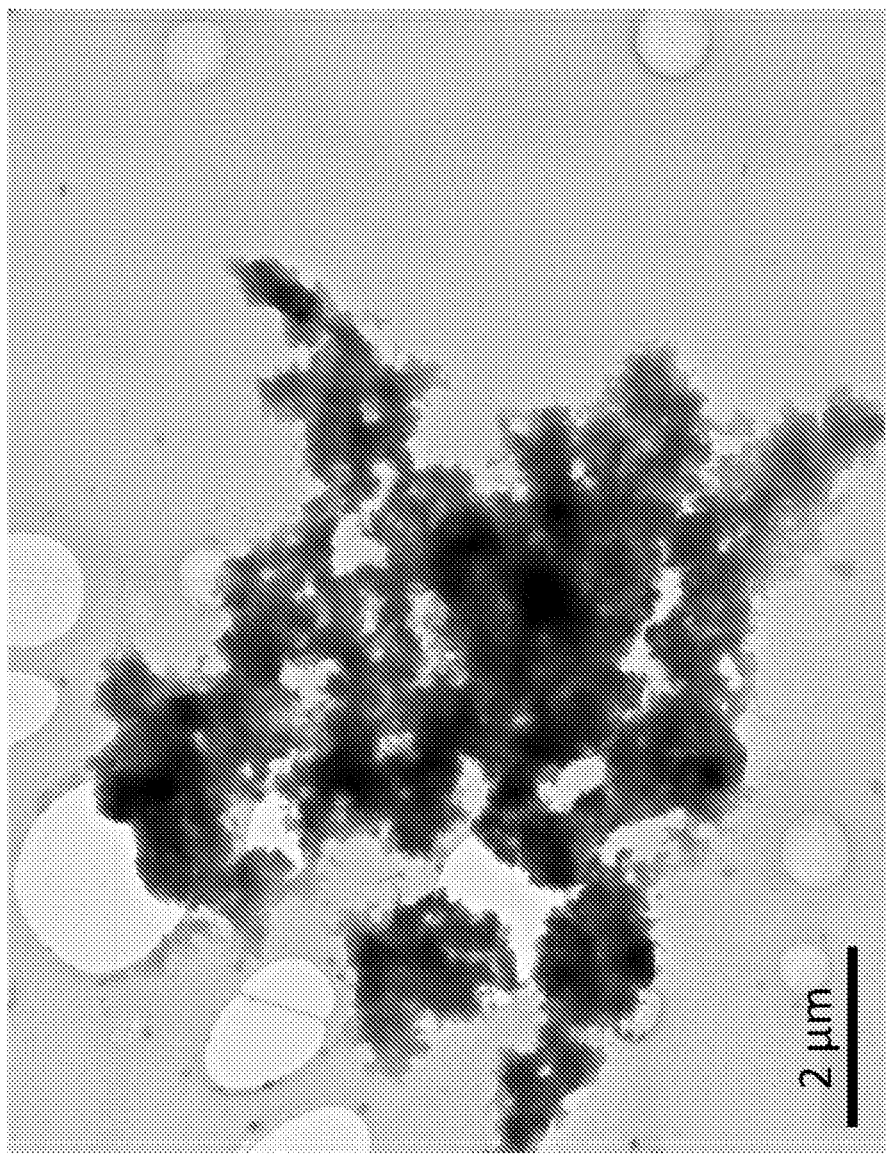
FIG. 1 is a TEM of sample $A_{1-MN}$ obtained in Example 1.
Figure 2:
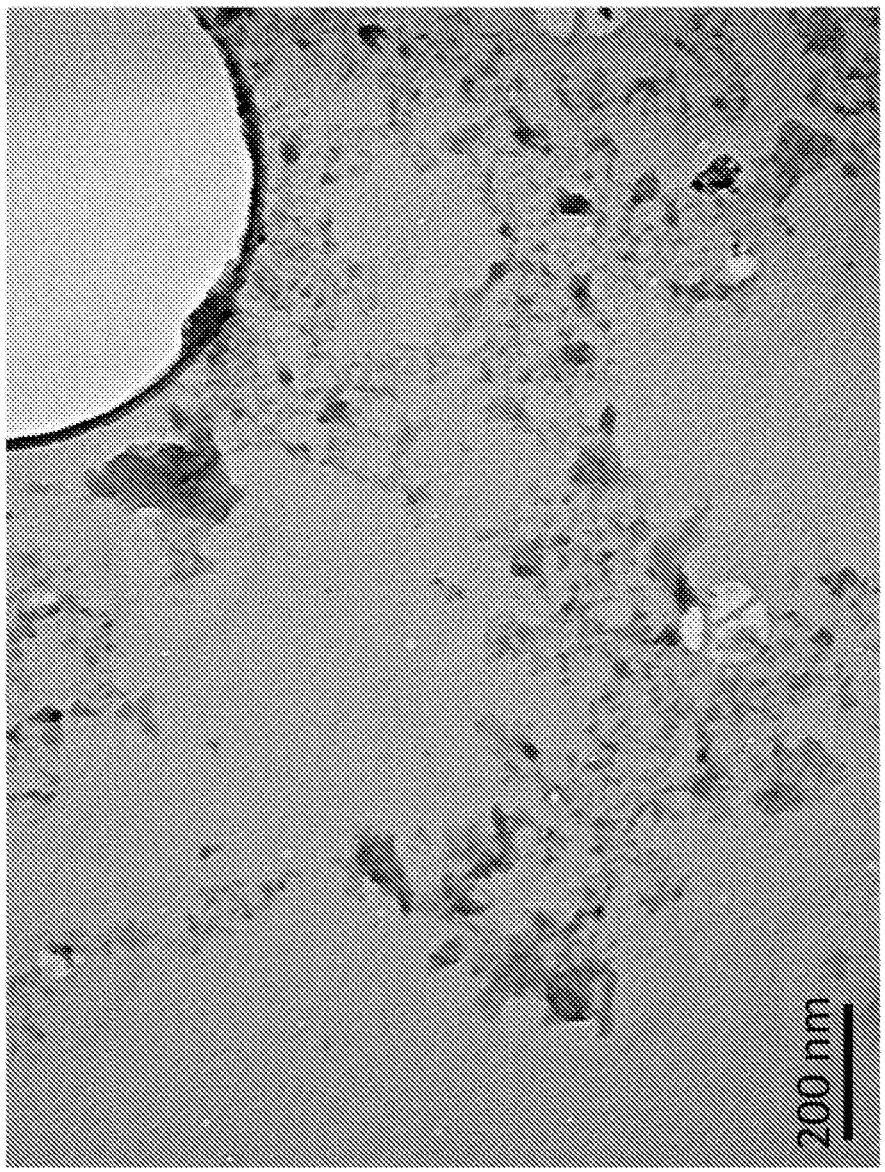
FIG. 2 is a TEM of sample $B_{NMP}$ obtained in Example 1.

FIG. 1 shows TEM of the brown supernatant $A_{1-MN}$ which is a low concentration suspension of material that is finely dispersed but agglomerated into >1 μm sized structures which are electron opaque, and therefore relatively thick. FIG. 2 shows the TEM of the black colloid $B_{NMP}$ that is comprised of thin sheets of variable dimension (10-200 nm) that are seen scattered across the surface of a holey carbon grid.

Thin films were prepared by vacuum filtration of dispersions into alumina membranes (0.2 μm Whatman Anodisc inorganic unsupported filter) mounted on a fritted glass filter. Films were washed with iso-propanol (15 mL) and dried in an oven (60° C.) for two days. XPS survey scans showed that the films are primarily comprised of carbon and oxygen. Aluminium was also present in significant levels (4-6 atom %) as a result of fractures in the thin films producing a paving of ~50 μm fragments with 10-20 μm gaps. Data correction based on an assumption of clean $Al_2O_3$ in areas not covered by carbonaceous material allows a C/O atom ratio of 12 and 10 to be determined for sample $A_{1-MN}$ and $B_{NMP}$ respectively.

Figure 3:
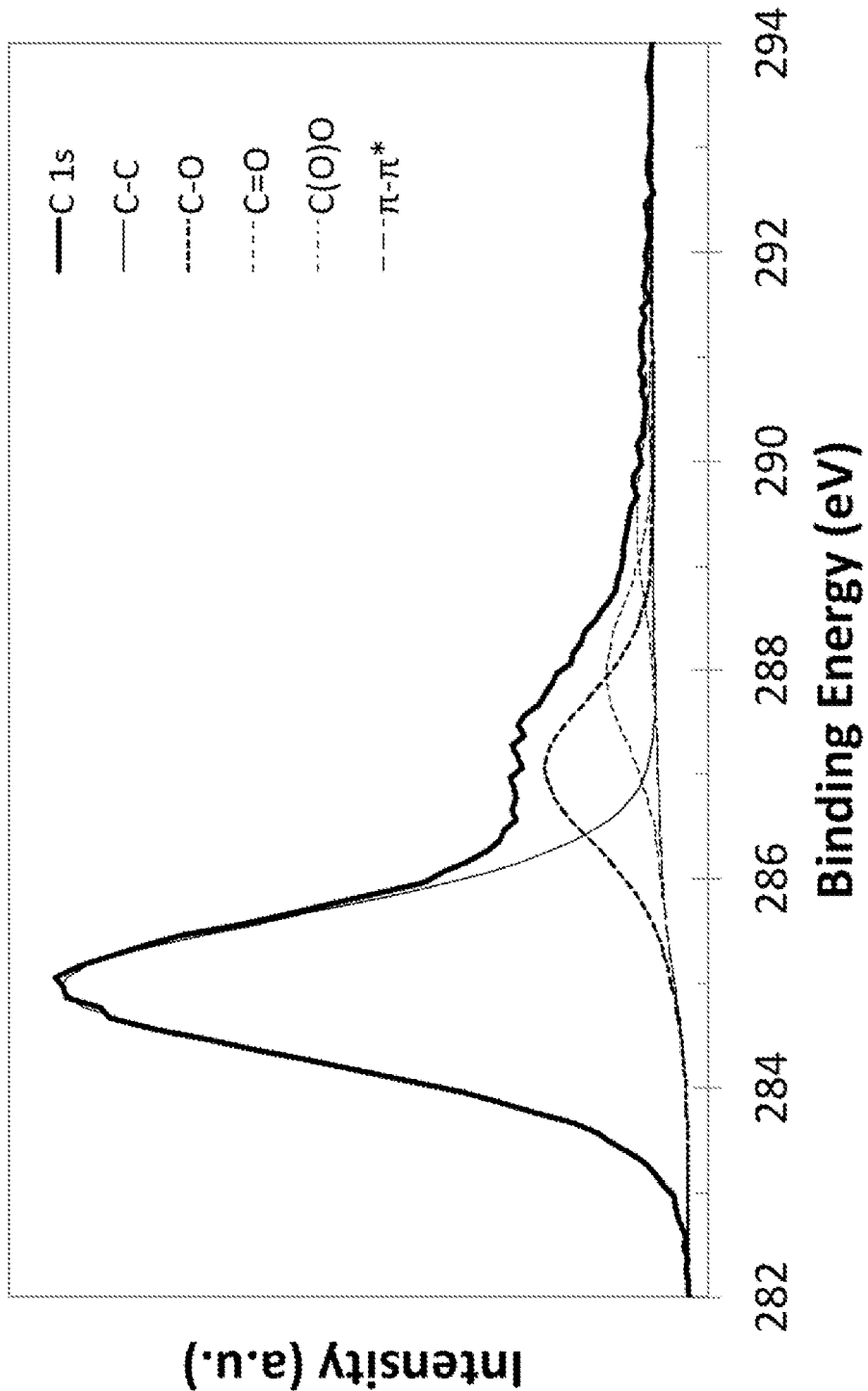
FIG. 3 is a C1s XPS of sample $A_{1-MN}$ obtained in Example 1.
Figure 4:
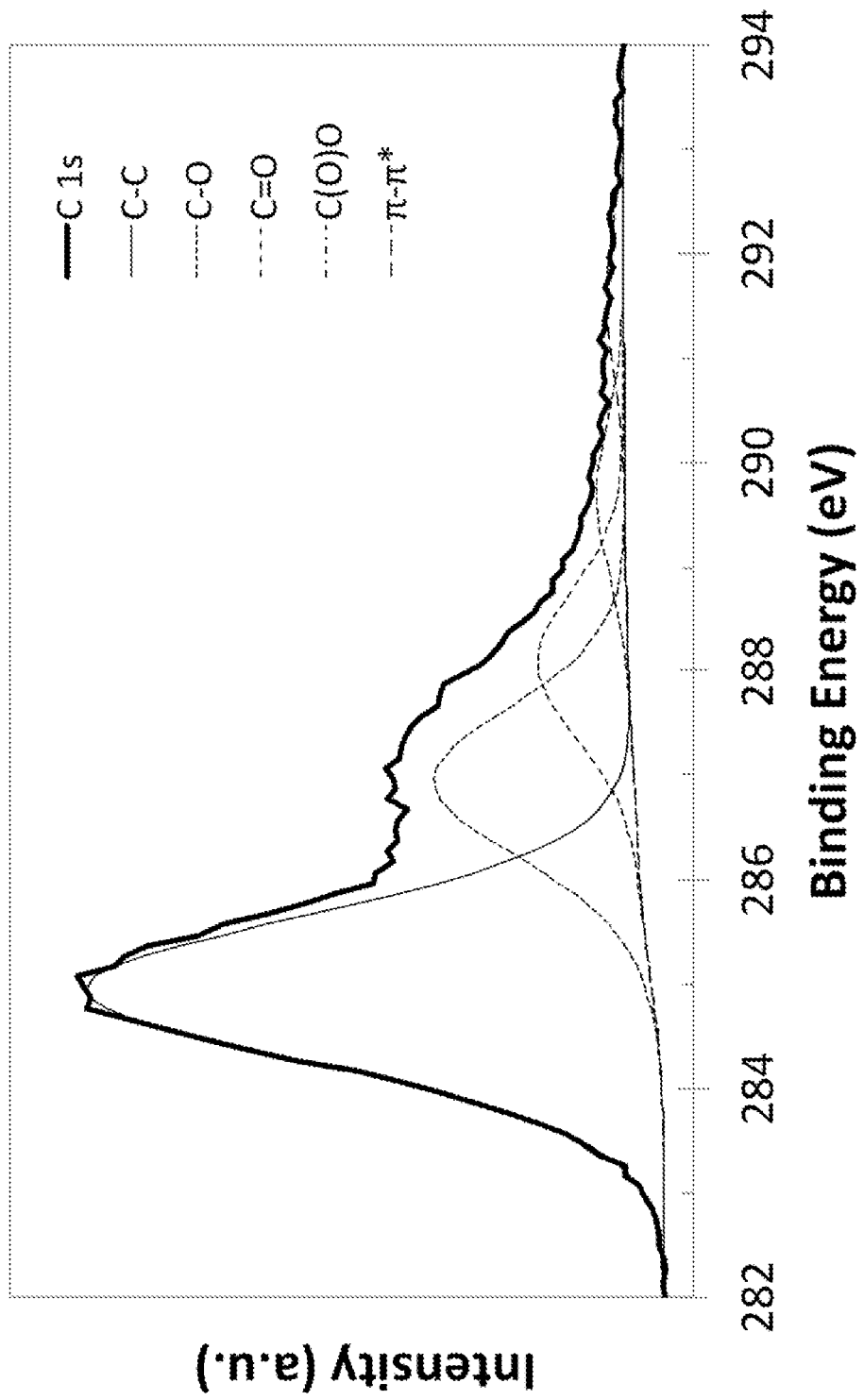
FIG. 4 is a C1s XPS of sample $B_{NMP}$ obtained in Example 1.

FIGS. 3 and 4 show the C1s XPS spectrum of $A_{1-MN}$ and $B_{NMP}$. The main peak was charge-referenced to an approximate binding energy of 285 eV and this feature was then fitted with five peaks: C—C (285.0 eV), C—O (286.5 eV), C=O (287.8 eV), O—C=O (289.5 eV) and a π-π* shake up, as seen in aromatics (291.5 eV). These features are also reported for graphene, although the C/O atom ratio is closer to levels found in reduced graphene oxide (rGO).

Figure 5:
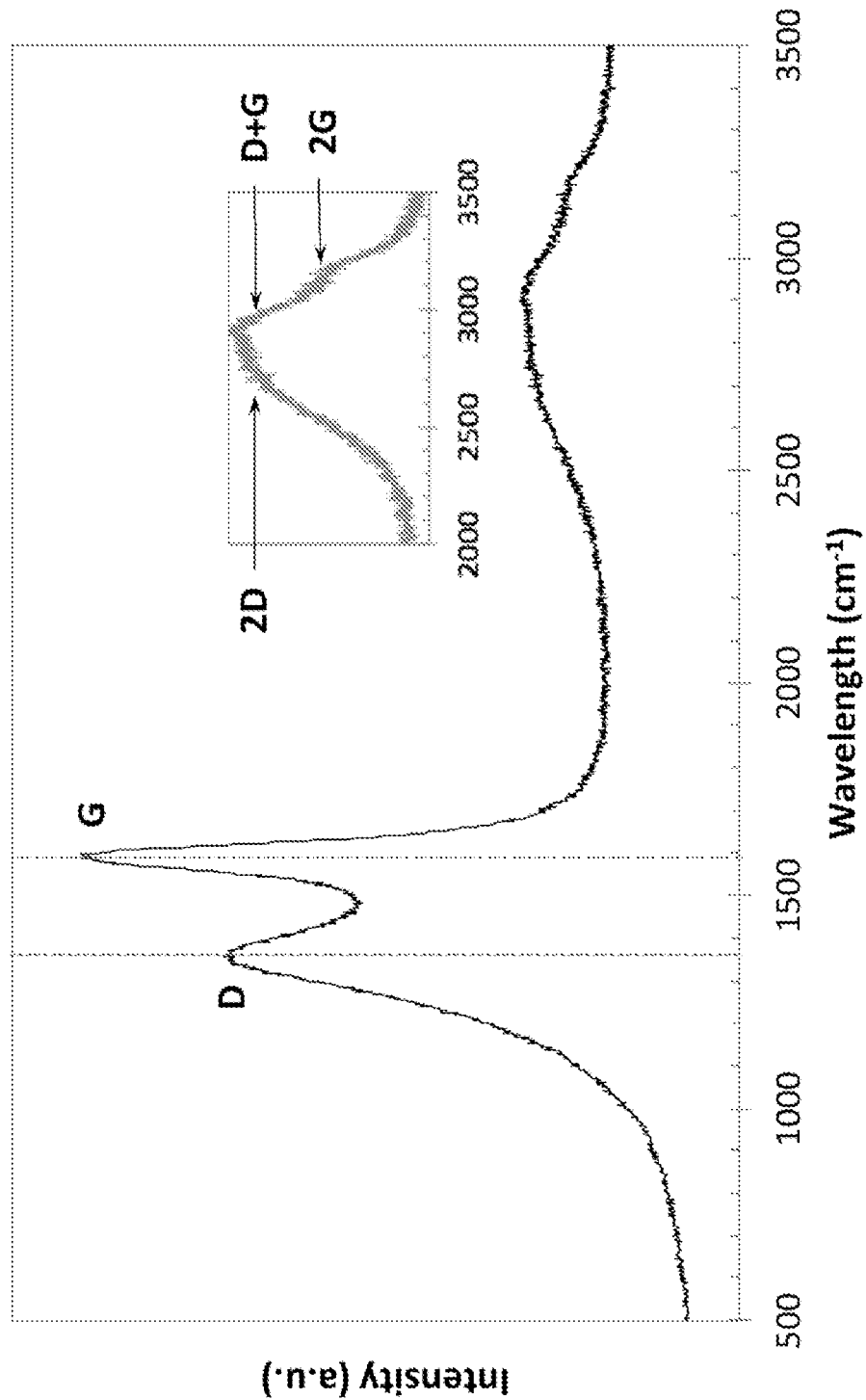
FIG. 5 is a Raman spectrum of sample $B_{NMP}$ obtained in Example 1.

FIG. 5 shows the Raman spectra of $B_{NMP}$. The G band (~1590 $cm^{-1}$) is shifted to a higher wavenumber than in graphite or graphene (~1580 $cm^{-1}$), reflecting the degree of oxidation and the presence of spa carbon atoms in the sample. The D band (~1360 $cm^{-1}$) also has a higher intensity than in pure forms of graphite and graphene, which can be attributed to defects and disorder at both the edge and on the basal plane of nanosheet structures. The intensity of the 2D band is low and seen in combination with other overtone bands (D+G and 2G). These features, along with the intensity ratio of these bands ($I_D/I_G$~0.83) and their full width at half maximum (FWHMG ~87 $cm^{-1}$) are consistent with values reported for nanosheets of graphene with a degree of oxidation.

Following literature study, it was thought that cavitation of the diaromatic component led cyclodehydrogenation reactions to proceed as follows:

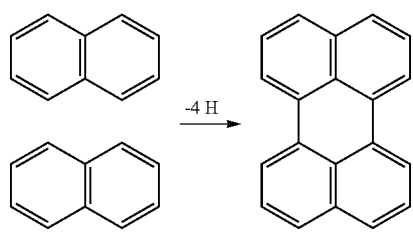

Alpha Position Reaction (Peri-Condensation)

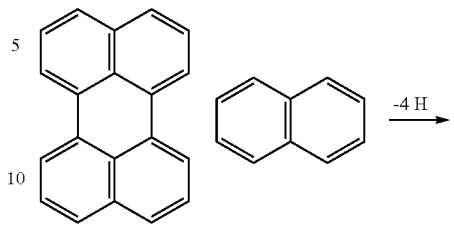

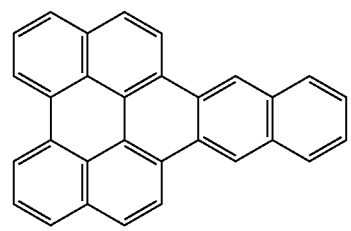

Beta Position Reaction allows for Cata-Condensation

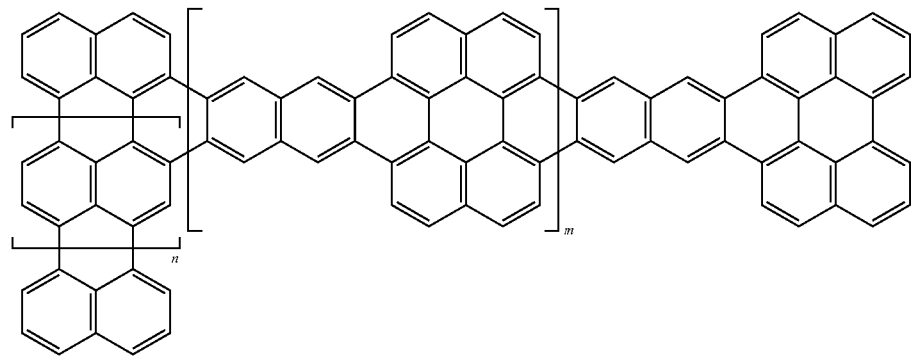

Subsequent reactions can take place to build up the unit cell at adjacent alpha-alpha positions or beta-beta positions.

Example 2

A trial was conducted to determine whether hydrodynamic cavitation of a diaromatic component could deliver similar results to those seen during the ultrasonic cavitation of Example 1.

A liquid medium consisting of 1-methyl naphthalene was continuously circulated through a high pressure homogenizer at a fixed pressure over a given time.

The homogenizer was a Benchtop Panda Plus 2000 unit (Serial Number 9759), which works on the principle of forcing liquid through an annular constriction formed between an impact head and an impact ring. Feed pressure of the unit was adjusted by varying the size of the constriction. Back-pressure was set to 30 barg using a secondary valve.

In a first run, a volume of 250 mL 1-methyl naphthalene was circulated at a feed pressure of 600 barg for 10 minutes.

The starting temperature of the 1-methyl naphthalene was recorded as 18.5° C. and the end temperature was 45° C.

In a second run, a volume of 200 mL 1-methyl naphthalene was circulated at a feed pressure of 1000 barg for 10 minutes. The starting temperature of the 1-methyl naphthalene was recorded as 39° C. and the end temperature was 66° C.

In each run, the 1-methyl naphthalene starting material was straw-coloured. After the 10 min, a black dispersion was visible in the 1-methyl naphthalene. There were some black solid particles left at the bottom of the collection beaker. The material was dried down on hot plates and some phase separation occurred.

Figure 6:
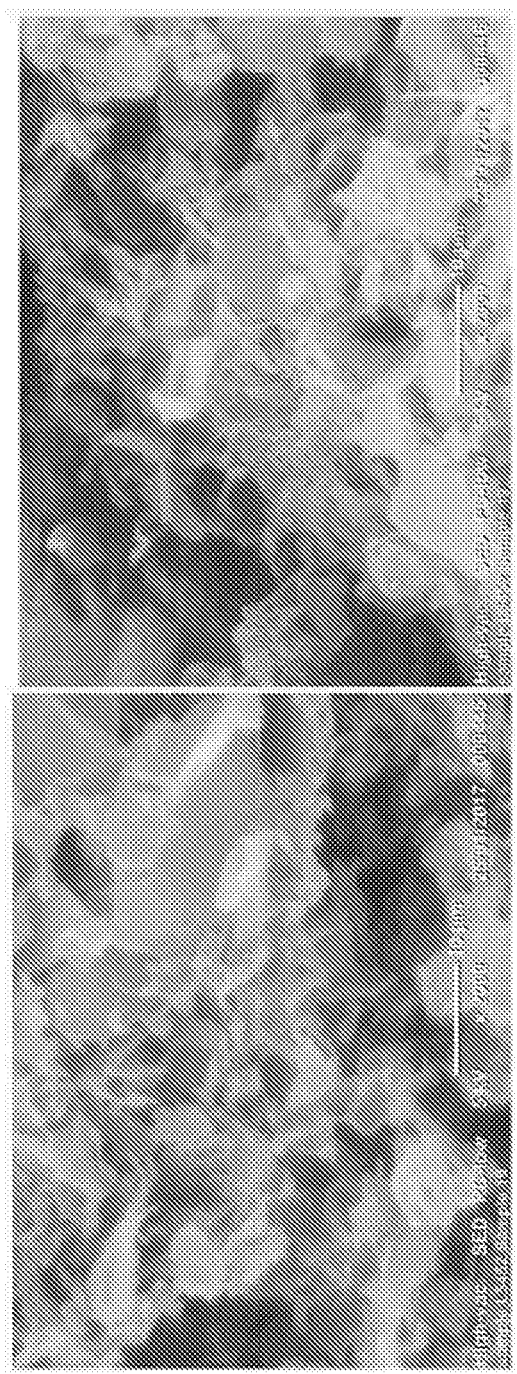
FIG. 6 shows SEM images obtained from the first run in Example 2.
Figure 7:
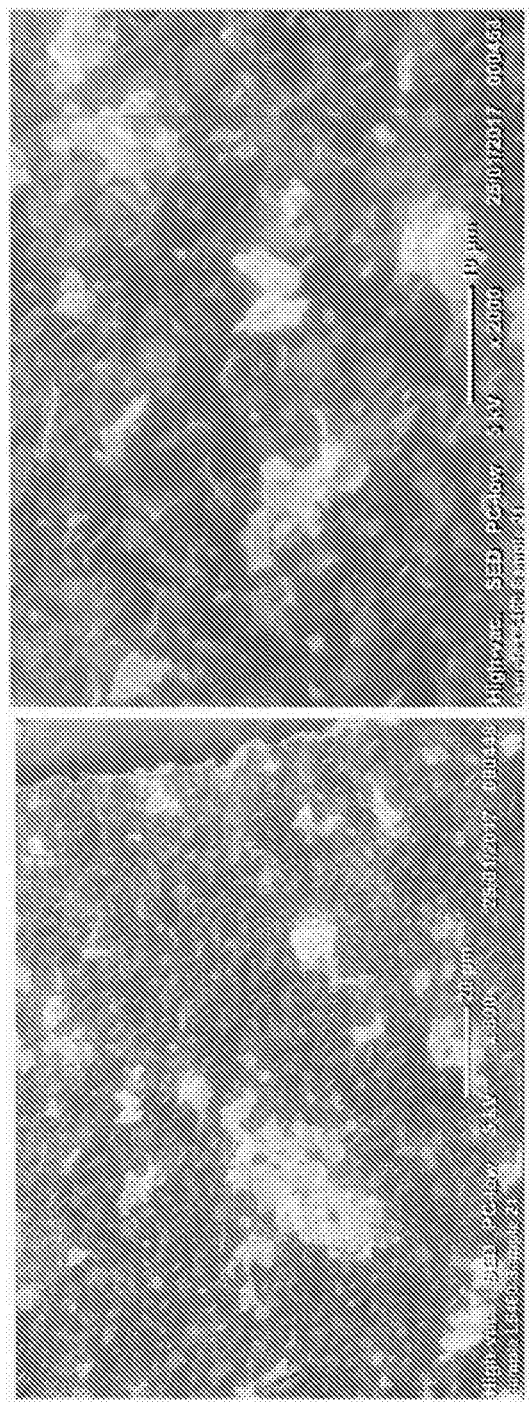
FIG. 7 shows SEM images obtained from the second run in Example 2.

Total solids were found to be 0.2 g in 250 mL for the first run and 0.3 g in 200 mL for the second run. With reference to FIGS. 6 and 7, SEM images showed the presence of platelets.

It was concluded that cavitation within the homogeniser led to the formation of particles similar to those obtained in Example 1.

Example 3

A trial was conducted out with the same general method and equipment as used in Example 2, but with 1-methyl naphthalene recovered from a previous run.

A volume of 200 mL 1-methyl naphthalene was circulated at a feed pressure of 1000 barg for 10 minutes. A water jacket was used in an attempt to stabilise temperature.

The following temperatures were noted:

| Time (min) | Temperature (° C.) |
|---|---|
| 0 | 21 |
| 10 | 59 |
| 15 | 64 |
| 20 | 68 |
| 25 | 73 |
| 30 | 76 |

The batch was then centrifuged in an IEC Centra 8 Centrifuge for 1100 rpm for 20 minutes. Material was collected at the bottom of the tubes but the dispersion still appeared to contain material. Therefore it was centrifuged at 1100 rpm for an additional 20 minutes.

On drying down, 0.7-0.8 g of solids was obtained. This is equivalent to 3.5-4 g/L of solids. This run showed that it is possible to recover and reuse 1-methyl naphthalene and also confirmed that yield increased over time.

Sheet resistance of the dried product was tested and found to be about 24 Ω/sq.

Figure 8:
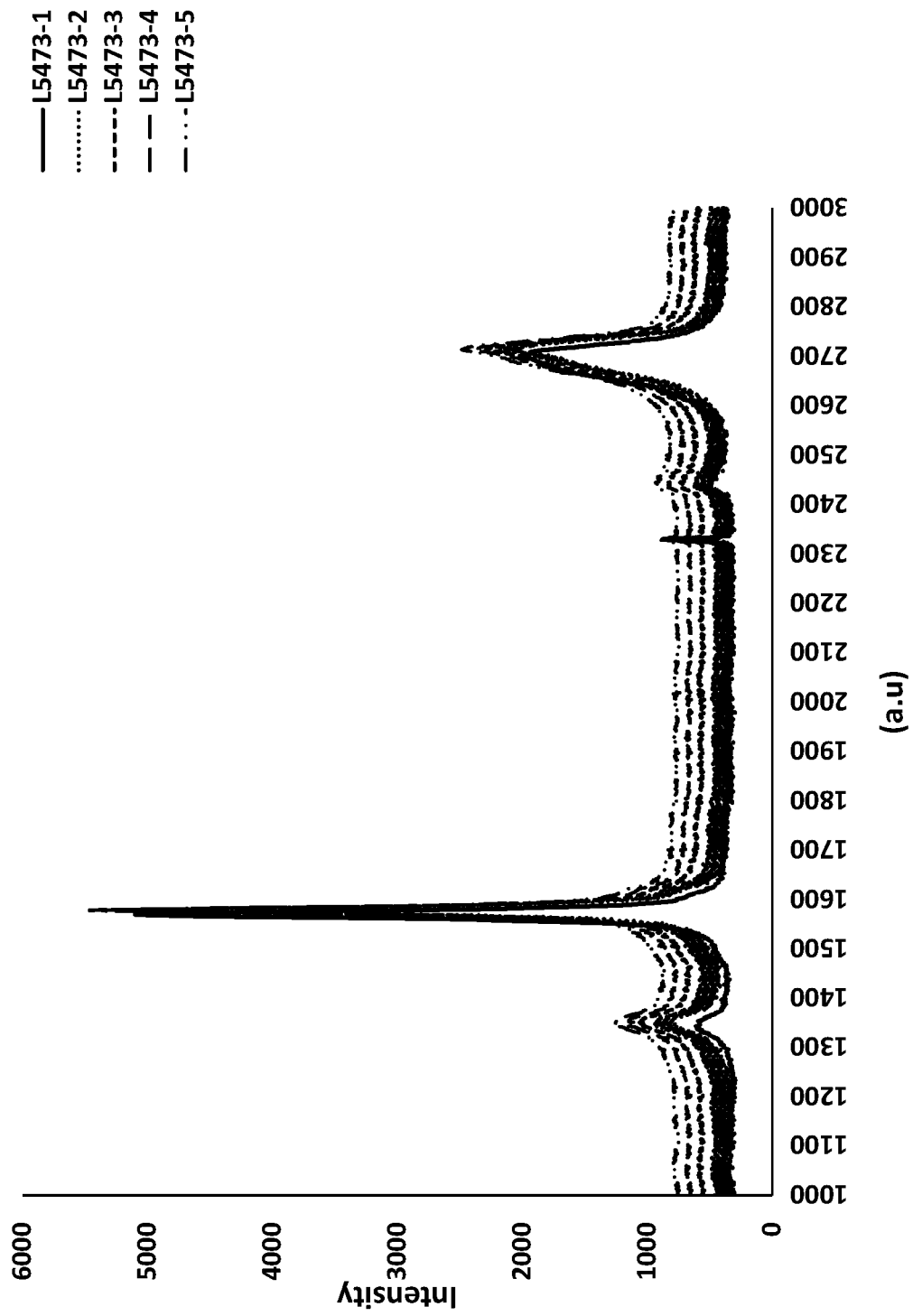
FIG. 8 shows a Raman spectrum obtained from Example 3.

With reference to FIG. 8, a Raman trace was obtained and showed that graphene was present in combination with graphitic carbon.

It was concluded that the obtained product particles comprised graphene layers.

Example 4

A trial was conducted to deposit conductive graphene onto the surface of silicon particles. The same homogenizer as in Examples 1 to 3 was employed.

150 mL of 1-methyl naphthalene and 1.5 g of silicon powder (99.9% purity, 325 mesh (11.5 micron average particle size)) were circulated at a feed pressure of 1000 bar for 10 min.

The following temperature rises in the system were observed:

| Time (min) | Temperature (° C.) |
|---|---|
| 0 | 23.7 |
| 3.5 | 47 |
| 7 | 61 |
| 10 | 71 |

The sample discoloured, consistent with 1-methyl naphthalene being converted to graphene platelets.

The graph below shows the corrected sheet resistance as measured with a 4 point probe, indicating a drop after 10 minutes of production—although it was difficult to form a film to make measurements.

| Sample | Sheet Resistance | Weight of Material/g | Corrected Sheet Resistance |
|---|---|---|---|
| Start | 20.6M Ω/□ | 0.001 Extremely thin film | 68K Ω/□ |
| 10 mins | 60K Ω/□ | 0.009 Very thin film | 18K Ω/□ |

Figure 9:
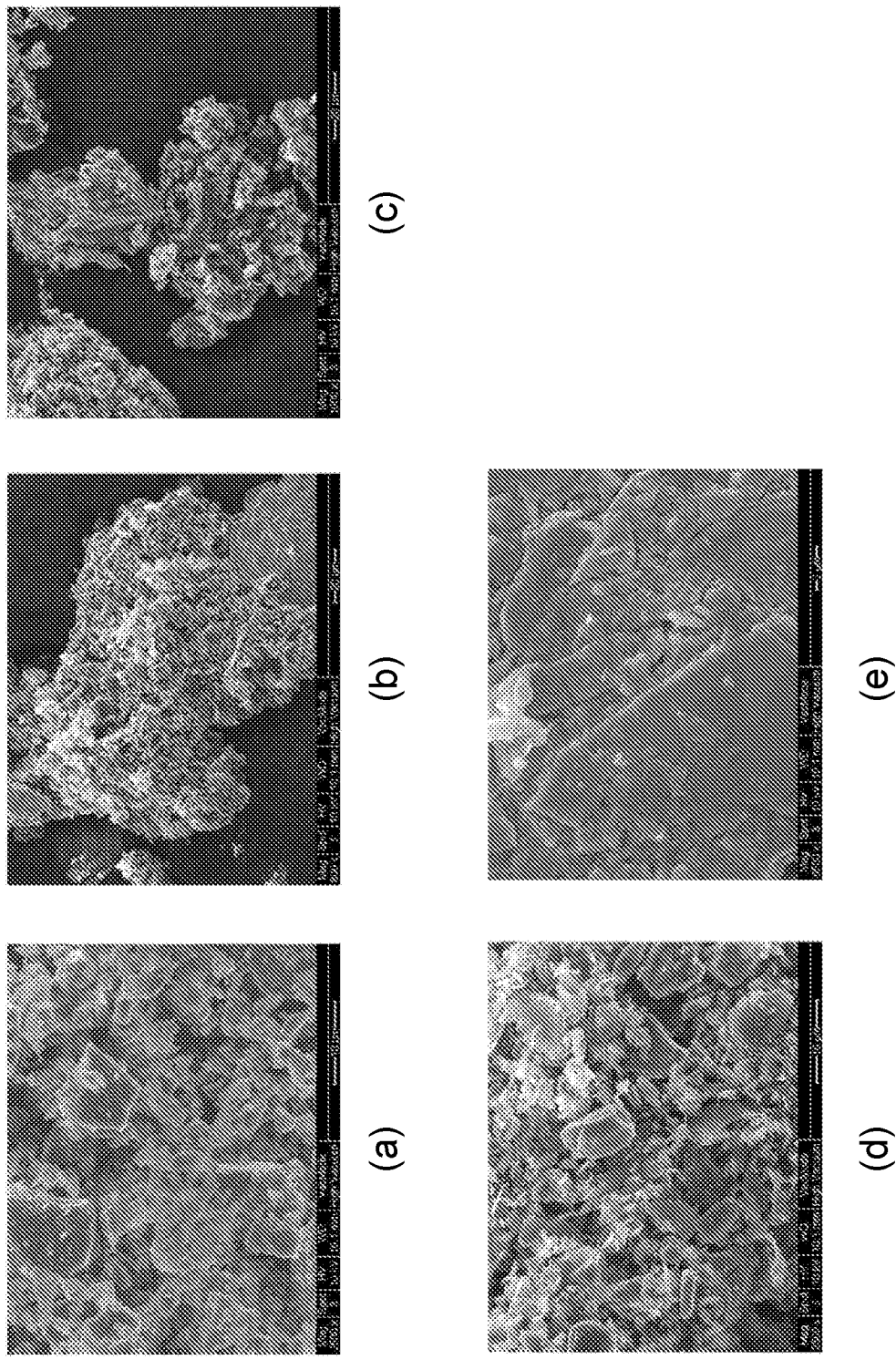
FIG. 9a is an SEM image of silicon starting material in Example 4.
FIGS. 9b to 9e are SEM images of graphene product in Example 4.

With reference to FIG. 9, SEM images suggest that flake-like material derived from 1-methyl naphthalene was grown and deposited onto the surfaces of the silicon particles. After deposition, the silicon particles looked less angular and appeared to have material on the surface.

Example 5

Sample Preparation

The hydrodynamic cavitation of 1-methyl naphthalene was carried out at various upstream pressures ($P_u$), using a Benchtop Panda Plus 2000 homogeniser as set out above in Example 2. Fluid was circulated at a fixed pressure for a set processing time.

The conditions used and samples prepared are set out in the table below. 1-MN was sourced from Sigma Aldrich at 95% and ≥95% purity. L7832 was produced by combining 1-MN (≥95% purity) with 10% v/v octylamine. A sample of graphene produced by delamination of graphite (L7716) was used as a reference sample.

| | Conditions | | | | |
|---|---|---|---|---|---|
| Sample | $P_u$ bar | CN | v ms$^{-1}$ | Time min | Fluid |
| L7826 | 600 | 20 | 337 | 60 | 200 mL 95% 1-MN |
| L7831 | 1000 | 33 | 440 | 60 | 200 mL 95% 1-MN |
| L7832 | 1000 | 33 | 440 | 30 | 270 mL ≥95% 1-MN 30 mL octylamine |
| L7829 | 1500 | 50 | 542 | 60 | 200 mL ≥95% 1-MN |

CN is sufficiently high in all cases to give high levels of cavitation in fast moving flows of 1-MN. This resulted in the rapid formation of black dispersions in all cases. Solid samples were obtained by drying down the dispersions on hot plates within a fume hood. 1-MN has a boiling point of 240° C. and so the samples were dried on hotplates at 260° C. until there was no more loss in weight.

Dispersions of L7716, L7826, L7831, L7829 and L7832 (5 mg) in 50 mL of N-methyl-2-pyrrolidone (NMP) were formed. Adding 5 mg of L7716 to 50 mL NMP and shaking produces a black dispersion. Establishing the dispersion of L7832 required some shaking and also exposure (5 minutes) to ultrasound in a Branson 200 ultrasonic cleaner bath (30 W). When L7826, L7831 and L7829 were added to NMP only a small fraction of the sample dispersed, even after treatment in the ultrasonic cleaner bath. A 13 mm extender horn powered by a VCX 750 ultrasonic processor (ex Sonics Materials Inc.) was used to apply ultrasound at 45 W (50% amplitude setting) directly to the NMP. This was done until dispersion formation took place with no further darkening in colour (typically after 10 minutes).

All samples ex hydrodynamic cavitation of 1-MN (L7826, L7829, L7831, L7832) had a greyish/black appearance consistent with dispersed graphene flakes (L7716) and contrastingly different from the brown dispersions produced when 1-MN was treated with ultrasound to promote the formation of nanosheets by cavitation. This reflects the smaller size of the flakes and/or the partially oxidised nature of the nanosheets produced under the milder ultrasound conditions. The term partially oxidised graphene (poG) is used hereinbelow to describe this material produced with ultrasound.

The samples were analysed using UV-vis, particle number density, XPS, TEM and SEM analysis.

UV-Vis Analysis

Figure 10:
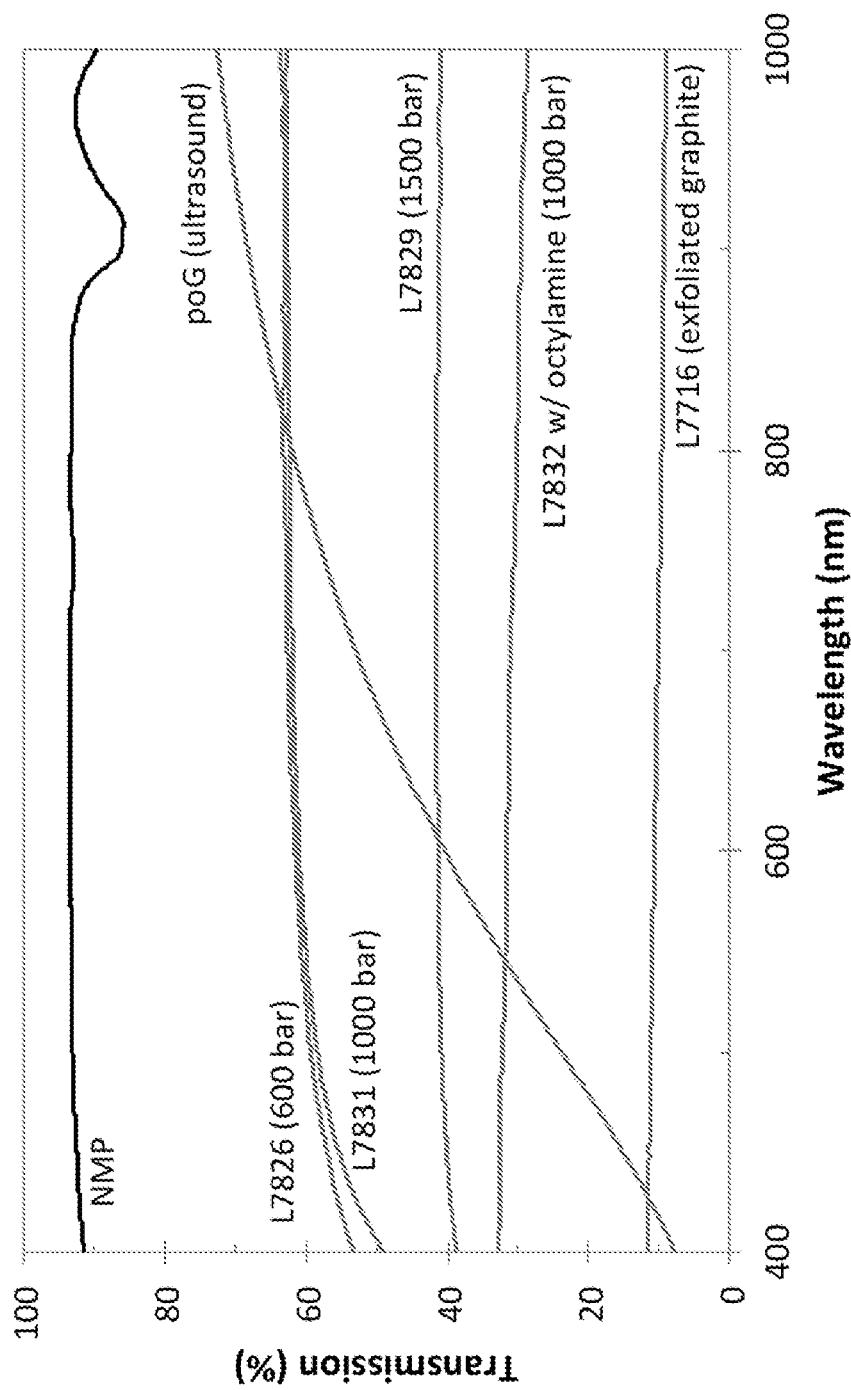
FIG. 10 shows UV-vis spectra of dispersions of samples obtained in Example 5.

UV-vis spectra were recorded (FIG. 10) using a UV-1699PC VWR Spectrophotometer (VWR International, Radnor, Pa.). The even transmission of light across the 400-1000 nm range for all the samples produced by hydrodynamic cavitation (L7832, L7826, L7831, L7829) is similar to the behaviour of the sample of graphene produced by exfoliation of graphite (L7716). The distinctive spectrum of poG (ex ultrasound cavitation) shows much lower transmission (stronger absorbance) at shorter wavelengths of light.

Particle Number Density

Figure 11:
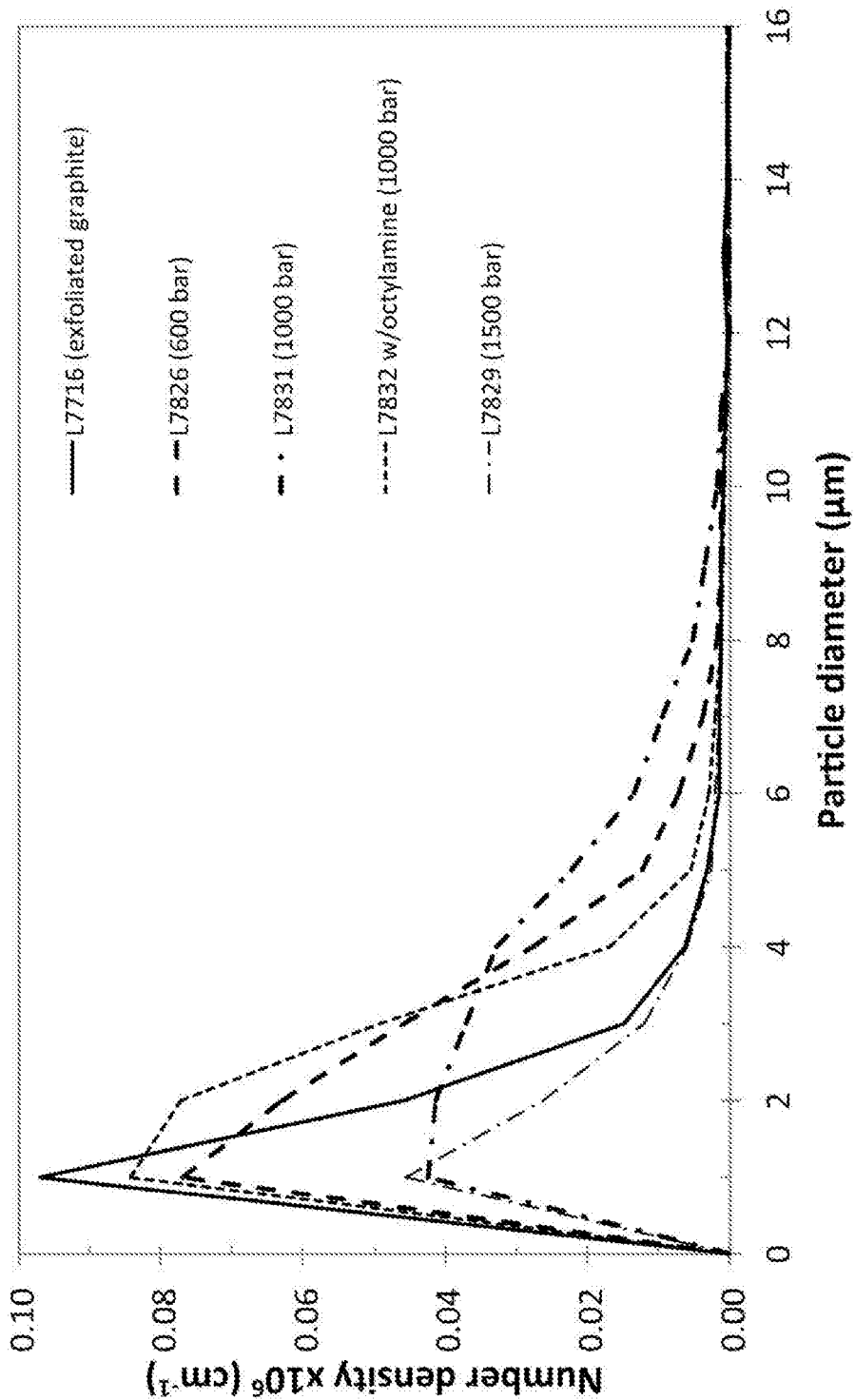
FIG. 11 shows the particle number density of dispersions of samples obtained in Example 5.

The particle number density (N) of the NMP dispersions was measured using a Spectrex LPC-2200 laser particle counter (Spectrex Corporation, Redwood City, Calif.), which makes measurements based on the principle of near-angle light scattering. Particles are reliably counted in the 1-100 µm size range. This technique has a detection limit of 1 µm and therefore only counts agglomerated nanosheets. Samples were gently swirled before being left to stand to allow any air bubbles to settle. Number density counts were based on an average of ten consecutive measurements. The results are set out in the table below and shown in FIG. 11. The data show low particle number densities consistent with stable dispersions. Samples with agglomerated particles would typically have particle number densities >×10 larger than the values in the table.

| Sample | N ± 2σ (0 days) ×10$^6$ cm$^{-3}$ |
|---|---|
| L7716 | 0.18 ± 0.01 |
| L7826 | 0.25 ± 0.03 |
| L7831 | 0.21 ± 0.01 |
| L7829 | 0.10 ± 0.01 |
| L7832 | 0.24 ± 0.03 |

X-Ray Photoelectron Spectroscopy (XPS)

Thin films were prepared as described for example 1, except that the films were dried under vacuum. The thin films from dispersions produced by hydrodynamic cavitation were grey in colour, compared to the brown films from dispersions produced by ultrasound.

The XPS data were acquired using a bespoke ultra-high vacuum system fitted with a Specs GmbH Focus 500 monochromated Al α X-ray source, Specs GmbH Phoibos 150 mm mean radius hemispherical analyser with 9-channeltron detection, and a Specs GmbH FG20 charge neutralising electron gun. Survey spectra were acquired over the binding energy range 1100-0 eV using a pass energy of 50 eV and high resolution scans were made over the C 1s, O 1s and N 1s photoelectron lines (where detected) using a pass energy of 20 eV. Under these conditions the full width at half maximum (FWHM) of the Ag $3d_{5/2}$ reference line is <0.8 eV. In each case, the analysis was an area average over a region approximately 2 mm in diameter on the sample surface.

The energy scale of the instrument is calibrated according to ISO standard 15472, and the intensity scale is calibrated using an in-house method traceable to the UK National Physical Laboratory. Data were quantified using Scofield cross sections corrected for the energy dependencies of the electron attenuation lengths and the instrument transmission. Data interpretation was carried out using CasaXPS software v2.3.16.

Prior to detailed analysis, the spectra were charge-corrected so that the principal component of the C 1s peak appeared at a binding energy of 285.0 eV, as is standard practice in XPS analysis of insulating samples. However the samples were difficult to charge-neutralise satisfactorily, and the spectra collected represent best-efforts after spending significant time optimising the charge neutralising electron flood gun conditions. In some cases, differential charging between the substrate and the sample was evident.

The C 1s spectra of the samples are shown in FIG. 12.

Figure 12A:
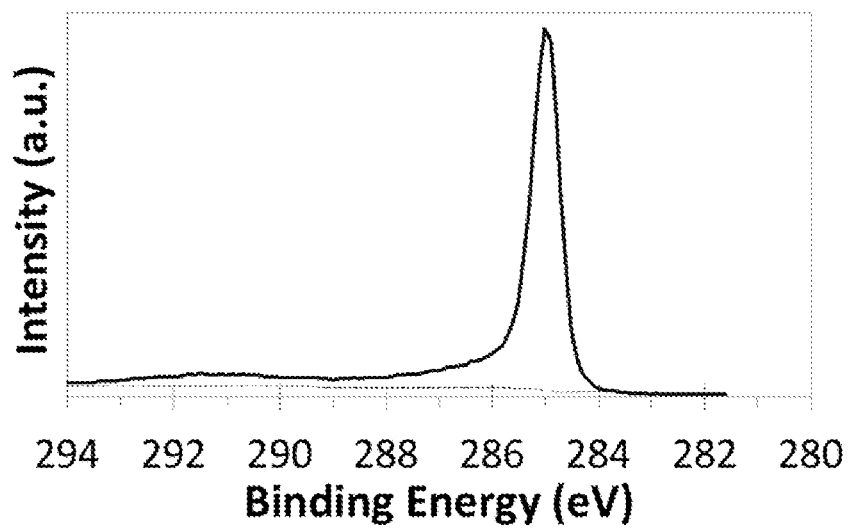
FIGS. 12a to e are C 1s XPS spectra of thin films of samples obtained in Example 5.
Figure 12B:
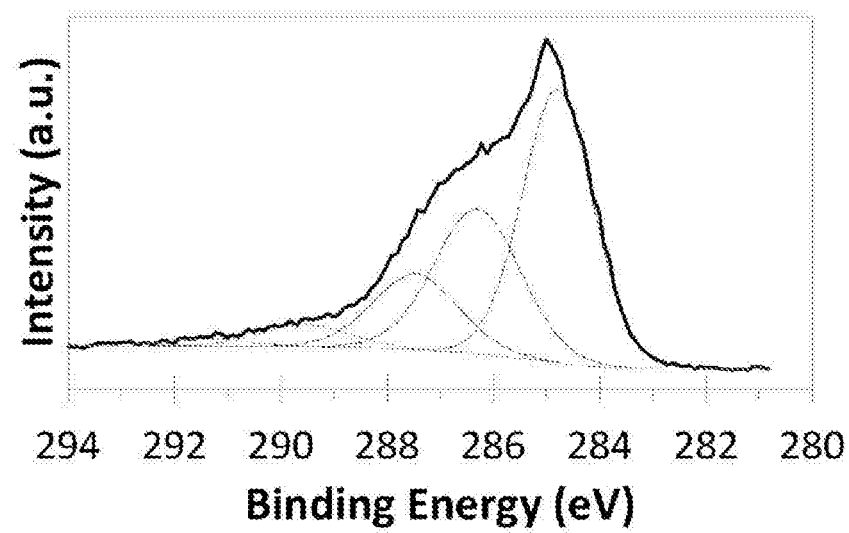
Figure 12C:
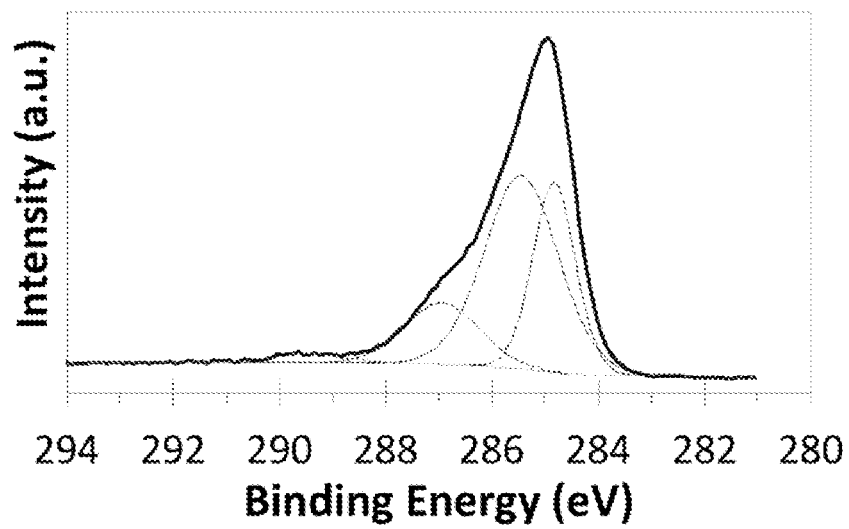
Figure 12D:
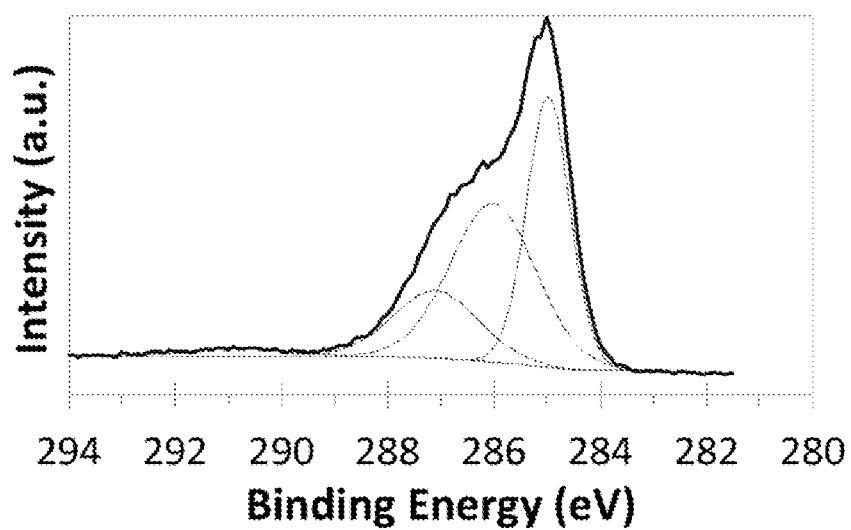
Figure 12E:
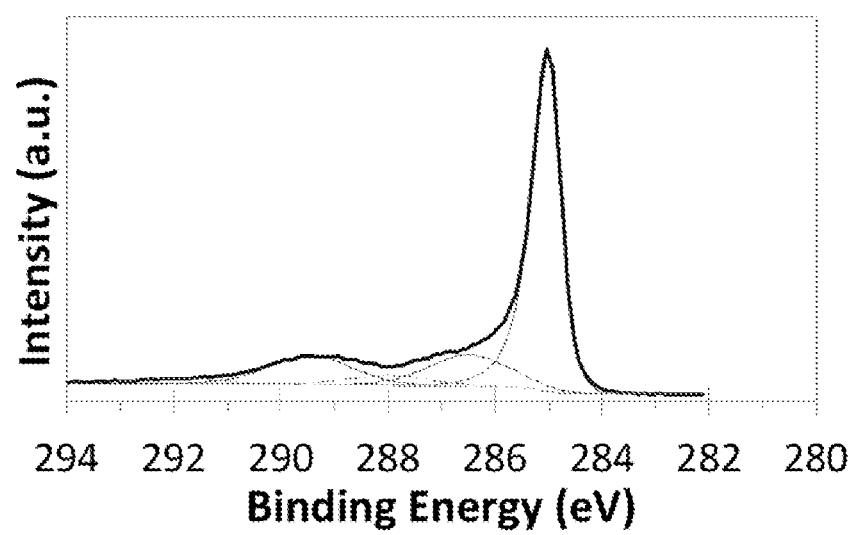

The spectrum of sample L7716 (ex exfoliated graphite; FIG. 12a) shows a C 1s peak that is consistent with graphene—a narrow asymmetric main peak of sp$^2$-hybridised carbon at 285 eV (FWHM of 0.63 eV) and weak plasmon loss features around 290-292 eV. The small increase in intensity around 286-288 eV is typical of a very low level of non-specific carbon-oxygen bonding.

L7826 (FIG. 12b), L7831 (FIG. 12c) and L7829 (FIG. 12d) all show a peak due to C—C bonding at approximately 285 eV with a series of features at higher binding energies that would typically be interpreted as consistent with varying degrees of carbon-oxygen bonding.

L7832 (FIG. 12e) shows a narrow asymmetric C 1s peak that is consistent with sp$^2$-hybridised carbon (FWHM of 0.5 eV)—similar to that seen for the exfoliated graphite sample (L7716). The low level of oxygen observed in the survey scan is reflected in the small proportion of carbon-oxygen bonding. Unambiguous assignment of deconvoluted peaks fitted on the high energy side of this feature to amine (C—N) or amide (C(O)—N) bonds is not possible.

A strong C 1s peak dominated all the spectra, with some signal from the underlying Anodisc substrate (Al, P and O) being seen in all cases. It was possible to assume the area of exposed Anodisc was proportional to the sum of the Al and P signals and to correct the C, O and N concentrations for the contribution from the substrate and re-normalise to give the approximate composition of the thin film overlayer. The elemental compositions (atom %) determined in this way are set out in the table below. RP065 and RP032 are samples prepared by treating 1-MN (RP065) and 1-MN with 10% octylamine (RP032) with ultrasound, for comparison. The detection of Si is assumed to be related to previous experiments carried out using the homogeniser. It is not clear why the Cl signal for sample L7831 is atypically high.

| Peak | RP065 | RP032 | L7716 | L7826 | L7829 | L7831 | L7832 |
|------|-------|-------|-------|-------|-------|-------|-------|
| O 1s | 14.64 | 14.18 | 2.29 | 13.16 | 10.68 | 6.51 | 3.83 |
| C 1s | 84.07 | 81.07 | 97.71 | 80.81 | 83.89 | 84.46 | 92.21 |
| N 1s | 1.30 | 4.15 | — | 1.93 | 1.22 | 0.49 | 0.34 |
| Si 2p | — | — | — | 2.67 | 3.98 | 1.14 | 1.53 |
| Cl 2p | — | — | — | 1.43 | 0.22 | 7.39 | 2.10 |
| Na 1s | — | 0.25 | — | — | — | — | — |
| S 2p | — | 0.35 | — | — | — | — | — |
| C/O | 6 | 6 | 43 | 6 | 8 | 13 | 24 |

Transmission Electron Microscopy (TEM)

Figure 13:
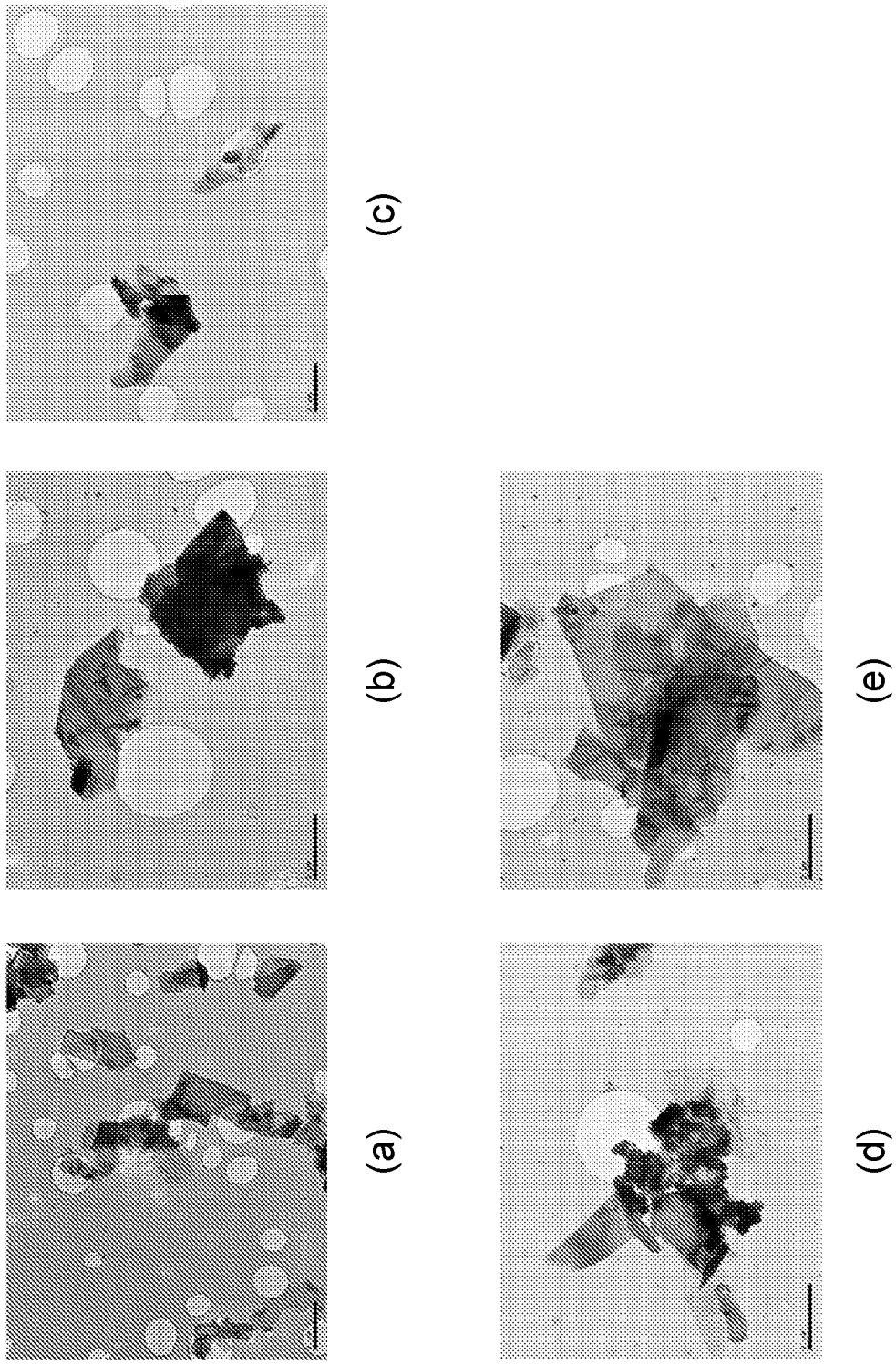
FIGS. 13a to e are TEM images of samples obtained in Example 5.

The dispersions were filtered onto holey carbon film 300 mesh copper TEM grids and dried. TEM images were acquired using a Phillips CM20 TEM in bright field transmission mode using a 200 kV beam energy and captured using the side-entry CoolSnap 1k×1k Peltier cooled camera system with Gatan Digital Micrograph software. An exemplary TEM image for each sample is shown in FIG. 13.

The exfoliated graphite sample (L7716; FIG. 13a) shows small thin angular flakes that are typically 1-3 μm in size and with a range of thicknesses. Some of the flake edges indicate that multiple layers are present. The low contrast at the edge of some flakes is indicative a very thin material. L7826 (FIG. 13b) shows irregular particles and flakes ranging from <1 μm to ~5 μm in size. A range of flake thicknesses is evident and some flakes have smaller flakes (~100 nm) on their surface. Smaller particles can also be seen in the background of some images. L7831 (FIG. 13c) shows scattered flakes that are typically 1-2 μm in size. Creases and folding is present. Some flakes clearly consist of multiple layers. L7829 (FIG. 13d) again shows flakes of variable size and thickness. Folding/creasing is observable in some images as well as the presence of smaller particles on the surface of some flakes and scattered across the background of the carbon grid. L7832 (FIG. 13e) shows clusters of 2-4 μm flakes. Flake folding is observable and small ~50 nm particles are scattered across the background of the carbon grid.

Figure 14:
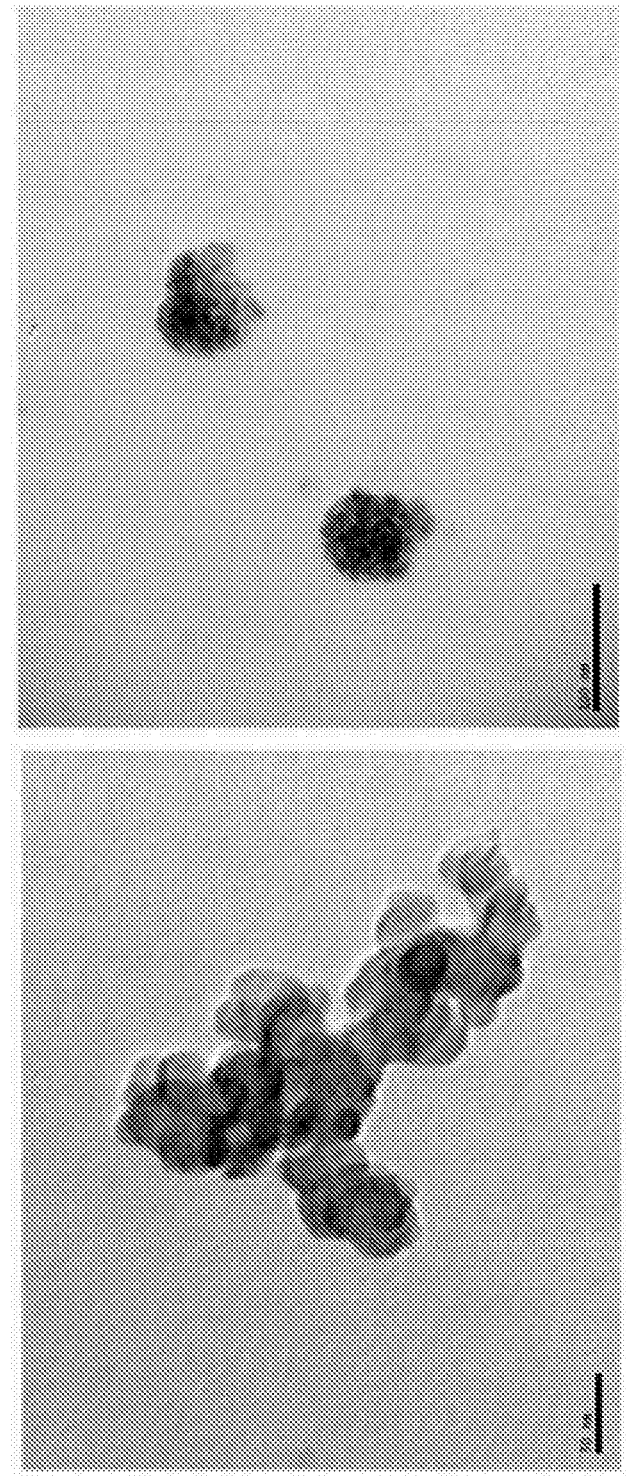
FIGS. 14a and b are high magnification TEM images of small particles seen in samples L7826 (FIG. 14a) and L7832 (FIG. 14b) of Example 5.

High magnification images of the small particles seen in the hydrodynamic samples reveal that they are clusters of 20-50 nm primary particles (FIG. 14a; L7826) or sometimes even smaller ~10 nm primary particles (FIG. 14b; L7832).

Scanning Electron Microscopy (SEM)

Analysis on powder samples was carried out using a Leo (now Zeiss) 1455VP SEM at 20 kV beam energy with 30 pA beam current. The powder samples were obtained by drying down the dispersions of the samples on hot plates within a fume hood as described above.

Figure 15:
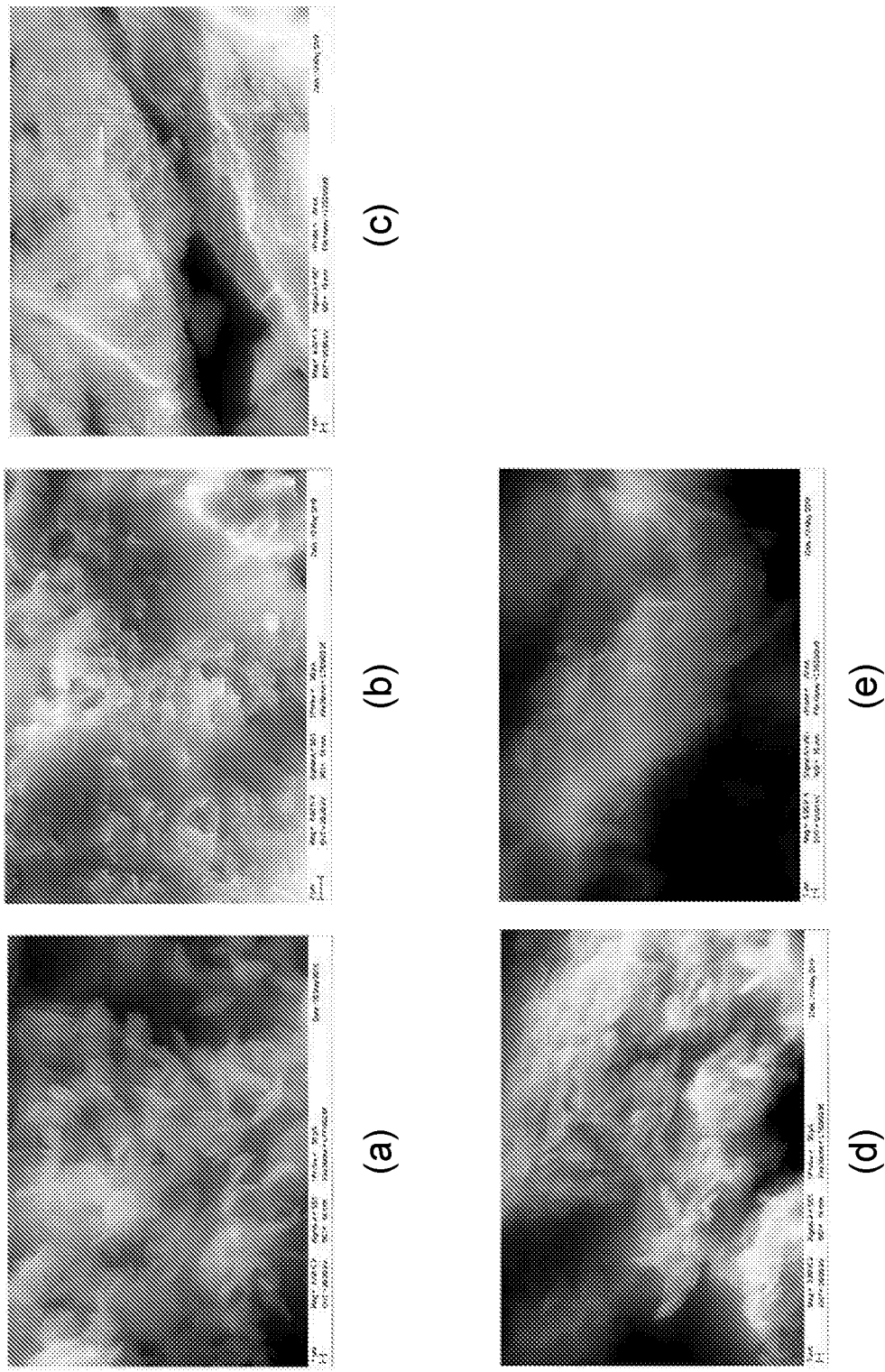
FIGS. 15a to e are SEM images of samples obtained in Example 5.

Images were acquired of a typical area at ×500 and ×5000 magnification. An exemplary SEM image at ×5000 magnification for each sample is shown in FIG. 15. Flake-like structures are seen in all the high magnification images, with L7716 (FIG. 15a) and L7832 (FIG. 15e) bearing the greatest resemblance.

The elemental composition of the samples was determined using SEM-EDX. EDX analysis was performed using an Oxford Instruments X-Max ultra-thin window EDX detector with Oxford INCA acquisition and processing software. The atom % composition obtained via this method of each of the samples is set out in the table below.

| Element | L7716 | L7826 | L7829 | L7831 | L7832 |
|---------|-------|-------|-------|-------|-------|
| C | 98.84 | 76.20 | 85.44 | 91.83 | 97.48 |
| O | 1.16 | 20.64 | 5.54 | 4.26 | 1.34 |
| Si | — | 2.57 | 6.48 | 1.91 | 0.75 |
| S | — | 0.17 | 0.49 | 0.13 | — |
| Cl | — | 0.12 | 0.11 | 1.62 | 0.30 |
| Ti | — | 0.10 | 0.82 | 0.03 | — |
| Fe | — | 0.06 | 0.52 | 0.07 | 0.05 |
| Zn | — | 0.13 | 0.27 | 0.04 | — |
| Al | — | — | 0.20 | — | — |
| Ca | — | — | 0.12 | 0.02 | — |
| Mo | — | — | — | — | 0.08 |
| Na | — | — | — | 0.08 | — |
| C/O | 85 | 4 | 15 | 22 | 73 |

Discussion

The high pressures employed in the GEA Panda Plus Unit (600-1500 bar) results in thin flakes that are >10 times larger in their two lateral dimensions than the smaller nanosheets produced during ultrasound cavitation. The acoustic pressure developed by the probe used during ultrasound treatment is <10 bar and this would appear to be why TEM images of poG ex ultrasound cavitation show 10-200 nm sized flakes. The higher pressures in the hydrodynamic reactor would be anticipated to result in bubbles growing to a larger size before they collapse. This means that the number of moles of 1-MN vapour in a hydrodynamic cavity will be greater, allowing for the growth of larger sheets. TEM images of the hydrodynamic samples shows flakes that are typically >1 μm and sometimes larger than 5 μm, indicating approximately a tenfold increase in sheet size.

The flakes produced during hydrodynamic cavitation are thin and similar in appearance to graphene produced by the exfoliation of graphite (L7716). Flakes with multiple layers are sometimes present and folding/creasing of sheets is also observable. The small circular features that appear in some of the TEM images look to be comprised of ≤50 nm primary particles. These may be soot-like material that forms inside small cavitation bubbles. Some of the dimensions are approaching those of graphene quantum dots.

Compositional analysis of material produced by the ultrasound cavitation of diaromatic components has indicated material that is similar to reduced forms of graphene oxide (rGO). The XPS C 1s spectra of poG materials show that some carbon-oxygen bonding is present in the nanosheets. The partial oxidation of the sheets is believed to be a consequence of the composition of cavitation bubbles, which are comprised of a mixture of hydrocarbon vapour and some gas. The gas is derived from dissolved air in the liquid reaction medium. Some—but not all—of this air is degassed during cavitation.

The higher pressures employed during hydrodynamic cavitation would be expected to result in greater levels of de-gassing and therefore lower levels of oxygen in the flakes that are produced. The C 1s peaks for hydrodynamically generated samples at $P_u$=600, 1000 and 1500 bar (L7826, L7831 and L7829) do show features that are consistent with carbon-oxygen bonding, indicating that degassing is still only partial during cavitation at these high pressures. The trend in the both the XPS and SEM composition data is that the C/O ratio of the material produced during hydrodynamic cavitation becomes larger when increasing $P_u$ from 600 to 1000 bar and then becomes smaller when the pressure is increased further to 1500 bar.

Combining octylamine with 1-MN leads to the formation of flakes that are similar to graphene from exfoliated graphite in size, thickness and composition. Some sheet functionalisation may have taken place, although evidence for alkyl attachment via amide and/or amine linkages is not clear from the XPS data. The significantly increased C/O ratio and the shape of the C 1s XPS peak when using the alkylamine shows that the flakes produced have a purity approaching that of graphene from exfoliated graphite. It is possible that the alkylamine—maybe through changes in the surface tension ($\sigma$) and/or viscosity ($\eta$) of the reaction medium—facilitates more effective de-gassing during cavitation.

Example 5

A trial was conducted to demonstrate hydrodynamic cavitation of a diaromatic component using a microfluidizer instead of a homogeniser.

The unit used was a Microfluidics M110P Microfluidizer. Clean 1-methyl naphthalene was run through the unit at a pressure of 1000 Bar. Volume<500 mL, number of passes=20. The starting material changed colour from a straw colour to a black dispersion, which then settled out to yield black particles.

Based on the change in colour, it was inferred that the microfluidizer has been successful in terms of converting 1-methyl naphthalene to graphene nanoplatelets in a similar way to the homogenizer.

CONCLUSION

Hydrodynamic cavitation allows for the preparation of products comprising one or more optionally functionalised graphene layers. Such products may take the form of graphene nanomaterials and/or substrate-borne graphene materials.

The process is readily scalable, may be operated in a continuous manner, and is thus more suited to industrial scale production than ultrasonic cavitation.

The hydrodynamic cavitation of diaromatic hydrocarbons offers an opportunity to:

Reproduce the same chemistry observed during the ultrasound cavitation of diaromatic components Achieve higher production rates than observed during ultrasound cavitation Scale-up reactors for the commercial production of 2-dimensional carbon materials Produce partially oxidised forms of graphene Produce functionalised forms of graphene by introducing suitable components into the liquid diaromatic reaction medium Produce more pristine forms of graphene (as observed when using alkylamines as a part of the reaction mixture).

The invention claimed is:

1. A process for preparing a product comprising one or more graphene layers, the process comprising: producing hydrodynamic cavitation in a liquid medium comprising a diaromatic component comprising one or more optionally substituted fused or linked diaromatic hydrocarbons to synthesize the one or more graphene layers from the diaromatic component.

2. The process of claim 1, wherein the hydrodynamic cavitation is produced by flowing a feed of the liquid medium through a constriction.

3. The process of claim 2, wherein the constriction has a maximum width of less than 1 mm.

4. The process of claim 2, comprising flowing a feed of liquid medium into a conduit having a principal axis, wherein the conduit is arranged to direct the liquid medium against an impact head having a face perpendicular or predominantly perpendicular to said principal axis; the impact head and the conduit being arranged so that said constriction results between an end of the conduit proximate to the impact head and the impact head.

5. The process of claim 2, wherein the feed of liquid medium is pressurised to a pressure of at least 300 bar or a pressure drop from the feed to the end of the constriction is at least 300 bar.

6. The process of claim 1, wherein the liquid medium is kept at a temperature within a range of plus/minus 5° C.

7. The process of claim 1, wherein the liquid medium is recycled and cavitation is repeatedly produced therein.

8. The process of claim 1, wherein the one or more graphene layers comprise one or more heteroatom impurities.

9. The process of claim 1, wherein the one or more graphene layers are oxidized.

10. The process of claim 1, wherein the one or more graphene layers are functionalized.

11. The process of claim 1, wherein the product comprises a substrate-borne graphene material formed by synthesizing the one or more graphene layers on substrate particles.

12. The process of claim 1, wherein the diaromatic component is a diaromatic hydrocarbon component consisting of one or more optionally substituted fused or linked diaromatic hydrocarbons.

13. The process of claim 1, wherein the diaromatic component comprises one or more diaromatic hydrocarbon compounds of Formula A or Formula B, optionally substituted with one or more moieties at one or more of the numbered positions:

Formula A

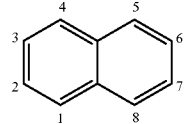

Formula B

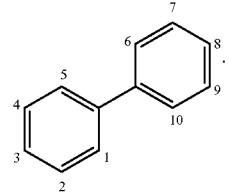

14. The process of claim 13, wherein the diaromatic component comprises one or more diaromatic hydrocarbon compounds of Formula A or Formula B substituted with one or more moieties selected from methyl, ethyl, and halides.

15. The process of claim 1, wherein the diaromatic component comprises 1-methylnaphthalene.

16. The process of claim 1, wherein the liquid medium comprises a stabilizing component for stabilizing a dispersion of graphene nanomaterial.

17. The process of claim 16, wherein the stabilizing component comprises N-Methyl-2-pyrrolidone (NMP).

18. A process for preparing a product comprising one or more graphene layers, the process comprising: producing hydrodynamic cavitation in a liquid medium comprising a diaromatic component comprising methylnaphthalene, and optionally naphthalene to synthesize the one or more graphene layers from the diaromatic component, wherein the hydrodynamic cavitation is produced by flowing a feed of the liquid medium pressurized to a pressure of at least 300 bar through a constriction.

* * * * *